US011019962B2

(12) United States Patent
Kick

(10) Patent No.: US 11,019,962 B2
(45) Date of Patent: Jun. 1, 2021

(54) CONTAINER APPARATUS

(71) Applicant: Merrilee Kick, Plano, TX (US)

(72) Inventor: Merrilee Kick, Plano, TX (US)

(*) Notice: Subject to any disclaimer, the term of this patent is extended or adjusted under 35 U.S.C. 154(b) by 0 days.

(21) Appl. No.: 16/923,668

(22) Filed: Jul. 8, 2020

(65) Prior Publication Data
US 2021/0107111 A1    Apr. 15, 2021

Related U.S. Application Data

(63) Continuation of application No. 16/598,443, filed on Oct. 10, 2019, and a continuation of application No. 29/708,953, filed on Oct. 10, 2019.

(51) Int. Cl.
| A47J 42/34 | (2006.01) |
| A47J 42/50 | (2006.01) |
| A47J 42/04 | (2006.01) |
| A47J 42/24 | (2006.01) |
| A47J 43/04 | (2006.01) |
| A47J 42/40 | (2006.01) |
| A47J 42/14 | (2006.01) |

(52) U.S. Cl.
CPC .............. *A47J 42/34* (2013.01); *A47J 42/04* (2013.01); *A47J 42/14* (2013.01); *A47J 42/24* (2013.01); *A47J 42/40* (2013.01); *A47J 42/50* (2013.01); *A47J 43/04* (2013.01)

(58) Field of Classification Search
CPC .. A47J 42/04; A47J 42/14; A47J 42/24; A47J 42/34; A47J 42/50; A47J 43/04
USPC ...................................................... 241/168.1
See application file for complete search history.

(56) References Cited

U.S. PATENT DOCUMENTS

| 795,746 | A | * | 7/1905 | Balding .................. A24F 15/18 |
| | | | | 206/238 |
| D49,555 | S | | 8/1916 | Vivaudou |
| D106,034 | S | | 9/1937 | Harrison |
| D168,471 | S | | 12/1952 | Nielsen |
| 2,745,642 | A | | 5/1956 | Hermann |
| 3,179,036 | A | | 4/1965 | Jackson |
| 3,281,024 | A | | 10/1966 | Henchert et al. |
| 3,314,569 | A | | 4/1967 | Seiferth |
| 3,583,455 | A | * | 6/1971 | Ostrowsky .............. A47J 43/25 |
| | | | | 241/95 |
| D224,516 | S | | 8/1972 | Amberg |
| D254,716 | S | | 4/1980 | Mascia |
| 4,936,482 | A | | 6/1990 | Gallagher et al. |

(Continued)

FOREIGN PATENT DOCUMENTS

| JP | 05032248 | 2/1993 |
| KR | 20-2010-0010225 U | 10/2010 |

(Continued)

OTHER PUBLICATIONS

International Search Report and Written Opinion issued by the Korean Intellectual Property Office for related International Application No. PCT/US2020/054815 dated Jan. 20, 2021, 10 pages.

*Primary Examiner* — Faye Francis
(74) *Attorney, Agent, or Firm* — Haynes and Boone, LLP

(57) ABSTRACT

A container apparatus includes a container body and a container lid. The container body defines a first internal cavity. The container lid is attached to the container body and defines a second internal cavity. The container lid includes protrusions extending within the second internal cavity to grind solid materials.

9 Claims, 35 Drawing Sheets

(56) References Cited

U.S. PATENT DOCUMENTS

| | | | |
|---|---|---|---|
| D321,319 S | 11/1991 | Giuseppe | |
| D325,697 S | 4/1992 | Parr | |
| D340,077 S | 10/1993 | Turner | |
| D352,898 S | 11/1994 | Vacher | |
| 5,407,086 A | 4/1995 | Ota | |
| 5,638,982 A | 6/1997 | Spector | |
| D383,646 S | 9/1997 | Jeppesen | |
| D400,400 S | 11/1998 | Hurst | |
| D424,381 S * | 5/2000 | Terenzio | D7/667 |
| D435,794 S | 1/2001 | Schmidt | |
| D437,226 S | 2/2001 | Sadeghi | |
| D438,763 S * | 3/2001 | Hood | D7/678 |
| D448,666 S | 10/2001 | Fields | |
| D449,990 S | 11/2001 | Odet | |
| 6,517,018 B2 * | 2/2003 | Manson | A47J 42/34 |
| | | | 241/169.1 |
| D474,378 S * | 5/2003 | Brandenburg | D7/679 |
| 6,574,883 B2 | 6/2003 | Giblin et al. | |
| D479,995 S | 9/2003 | Duceppe | |
| 6,793,094 B2 | 9/2004 | Turnbough | |
| 6,834,817 B2 * | 12/2004 | Manson | B02C 13/22 |
| | | | 241/169.1 |
| D510,509 S * | 10/2005 | Graves | D7/678 |
| D512,917 S | 12/2005 | Frisch et al. | |
| 7,051,892 B1 | 5/2006 | O'Day | |
| D562,134 S | 2/2008 | Studee | |
| D562,685 S | 2/2008 | Millspaw et al. | |
| D565,413 S | 4/2008 | Honkawa et al. | |
| 7,367,519 B2 * | 5/2008 | de Groote | A47J 19/04 |
| | | | 241/169.1 |
| 7,422,170 B2 * | 9/2008 | Bao | B02C 18/24 |
| | | | 241/168 |
| D596,489 S | 7/2009 | Weiss | |
| D606,404 S | 12/2009 | Diss | |
| D606,405 S | 12/2009 | Takata et al. | |
| D612,732 S | 3/2010 | Takata et al. | |
| D614,971 S | 5/2010 | Millspaw et al. | |
| 7,731,053 B2 | 6/2010 | Ivey | |
| 7,886,999 B2 * | 2/2011 | Ruzycky | A47J 19/06 |
| | | | 241/168 |
| D634,635 S | 3/2011 | Araujo et al. | |
| D648,217 S | 11/2011 | Fahey | |
| D650,280 S | 12/2011 | de Peyerimhoff et al. | |
| 8,083,167 B1 * | 12/2011 | Namakian | A47J 42/24 |
| | | | 241/169.1 |
| D658,061 S | 4/2012 | Furlan | |
| D663,619 S | 7/2012 | Pillet | |
| 8,220,732 B2 * | 7/2012 | Griffin | A47J 43/04 |
| | | | 241/169.1 |
| D668,919 S * | 10/2012 | Teng | D7/693 |
| D675,528 S | 2/2013 | Beaver | |
| D699,578 S | 2/2014 | Marina et al. | |
| D701,767 S | 4/2014 | Marina et al. | |
| D703,068 S | 4/2014 | Kick | |
| 8,695,906 B2 * | 4/2014 | Hainbach | A47J 42/34 |
| | | | 241/169.1 |
| D704,567 S | 5/2014 | Sanders | |
| D705,077 S | 5/2014 | Martin | |
| 8,720,807 B2 * | 5/2014 | Priebe | A61J 7/0007 |
| | | | 241/169 |
| 8,733,679 B2 * | 5/2014 | Camitta | B02C 18/16 |
| | | | 241/30 |
| D710,153 S | 8/2014 | Marini | |
| D711,247 S | 8/2014 | Sanders | |
| D721,585 S | 1/2015 | Gonzalez Rodriguez | |
| D732,978 S | 6/2015 | Kick | |
| D739,267 S | 9/2015 | Kick | |
| 9,241,597 B2 * | 1/2016 | Dukat | A47J 42/14 |
| 9,392,908 B2 * | 7/2016 | Edwards | A47J 42/12 |
| 9,427,020 B2 * | 8/2016 | Ruzycky | B02C 18/144 |
| D772,709 S | 11/2016 | Kick | |
| D772,722 S | 11/2016 | Kick | |
| 9,505,009 B1 * | 11/2016 | Wein | B02C 18/186 |
| 9,521,929 B1 * | 12/2016 | Raphael | B02C 13/22 |
| 9,681,777 B1 * | 6/2017 | Dukat | B02C 18/18 |
| 9,757,733 B1 * | 9/2017 | Dukat | A47J 42/40 |
| 9,873,125 B1 * | 1/2018 | LaGuardia, Jr. | A24F 13/00 |
| 10,039,418 B2 * | 8/2018 | Staiano | B02C 23/10 |
| 10,455,984 B1 * | 10/2019 | Abehasera | A47J 42/24 |
| 10,602,881 B2 * | 3/2020 | Gumbel | A47J 42/14 |
| 10,617,259 B2 * | 4/2020 | Staiano | B02C 23/10 |
| 2011/0253720 A1 | 10/2011 | Kick | |
| 2014/0061328 A1 | 3/2014 | Haymond | |
| 2015/0344177 A1 | 12/2015 | Kick | |
| 2018/0271327 A1 | 9/2018 | Haskins | |

FOREIGN PATENT DOCUMENTS

| | | |
|---|---|---|
| KR | 20-0467746 Y1 | 7/2013 |
| KR | 10-1518718 B1 | 5/2015 |
| KR | 10-2017-0091122 A | 8/2017 |

* cited by examiner

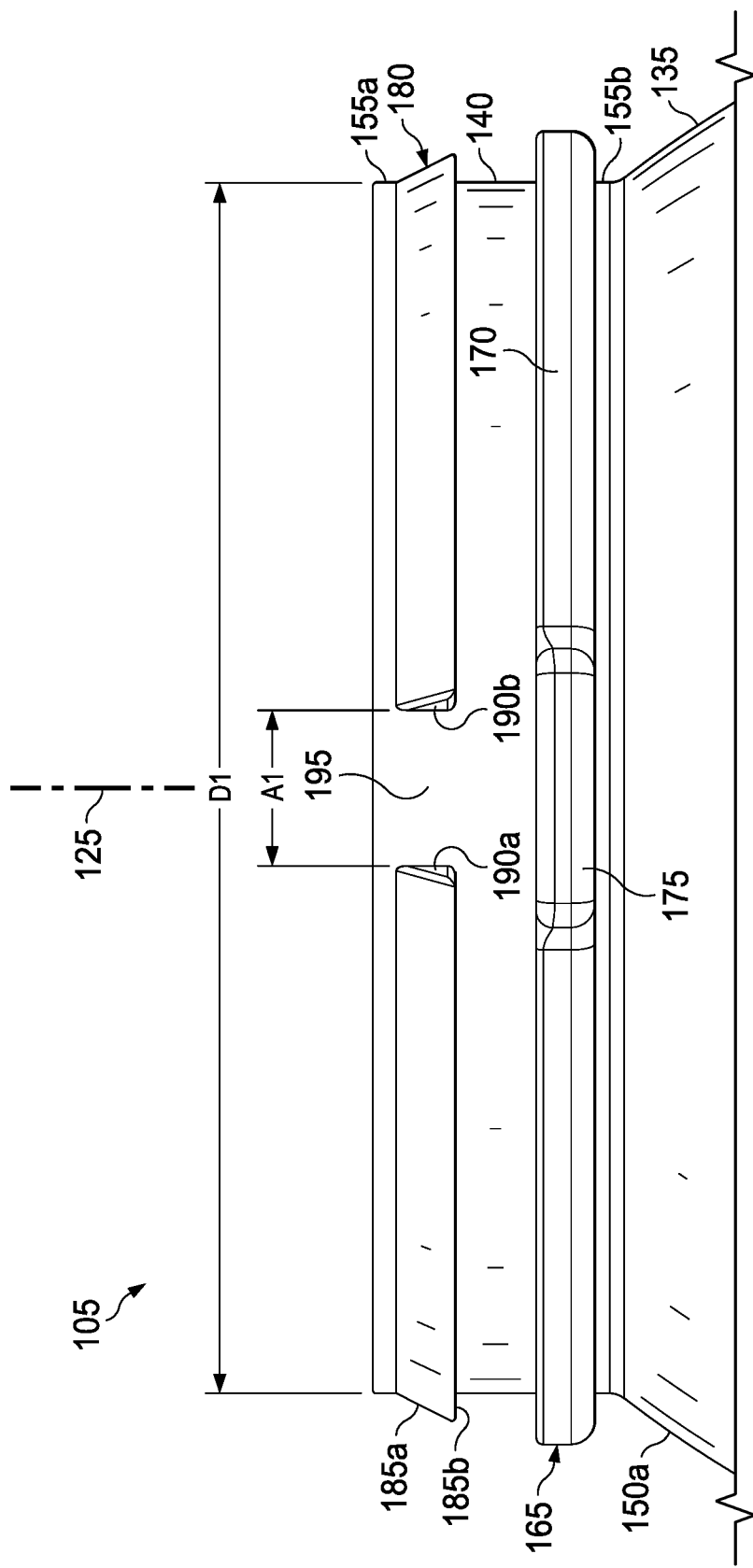

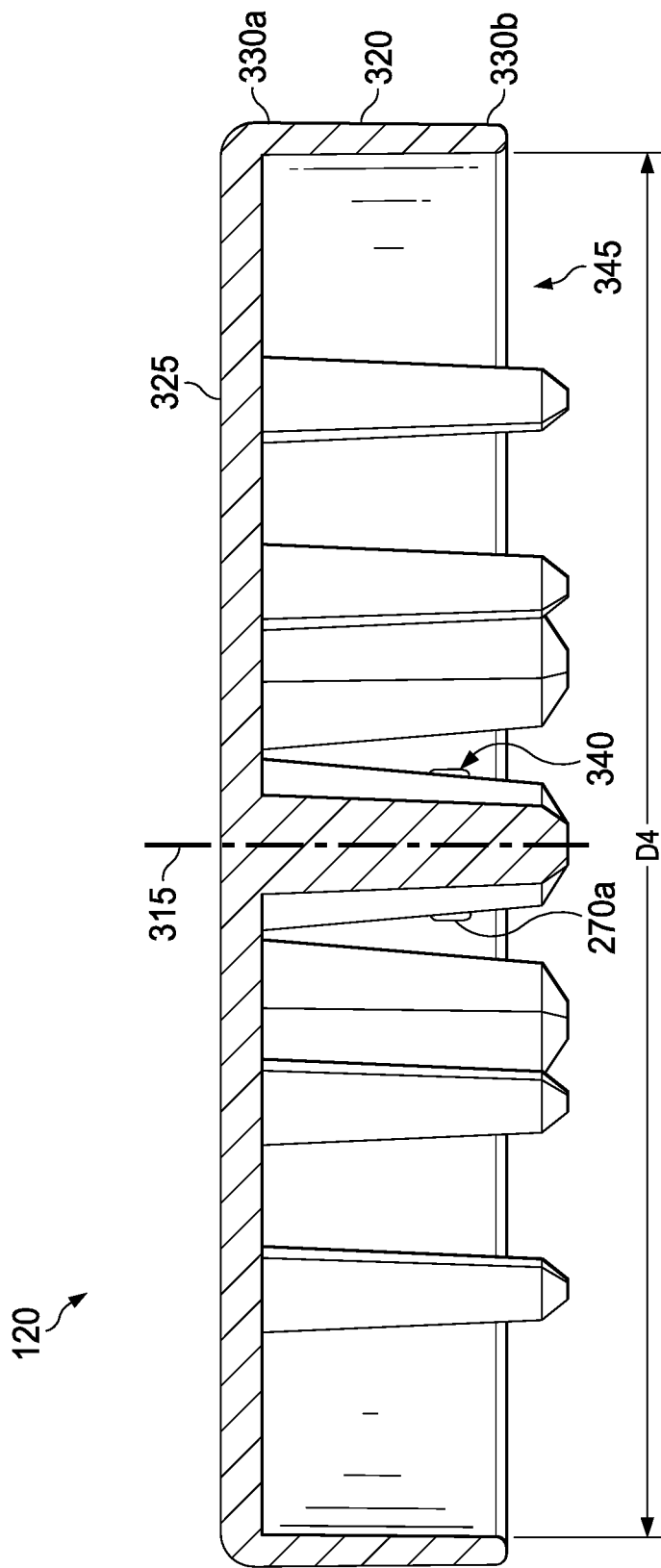

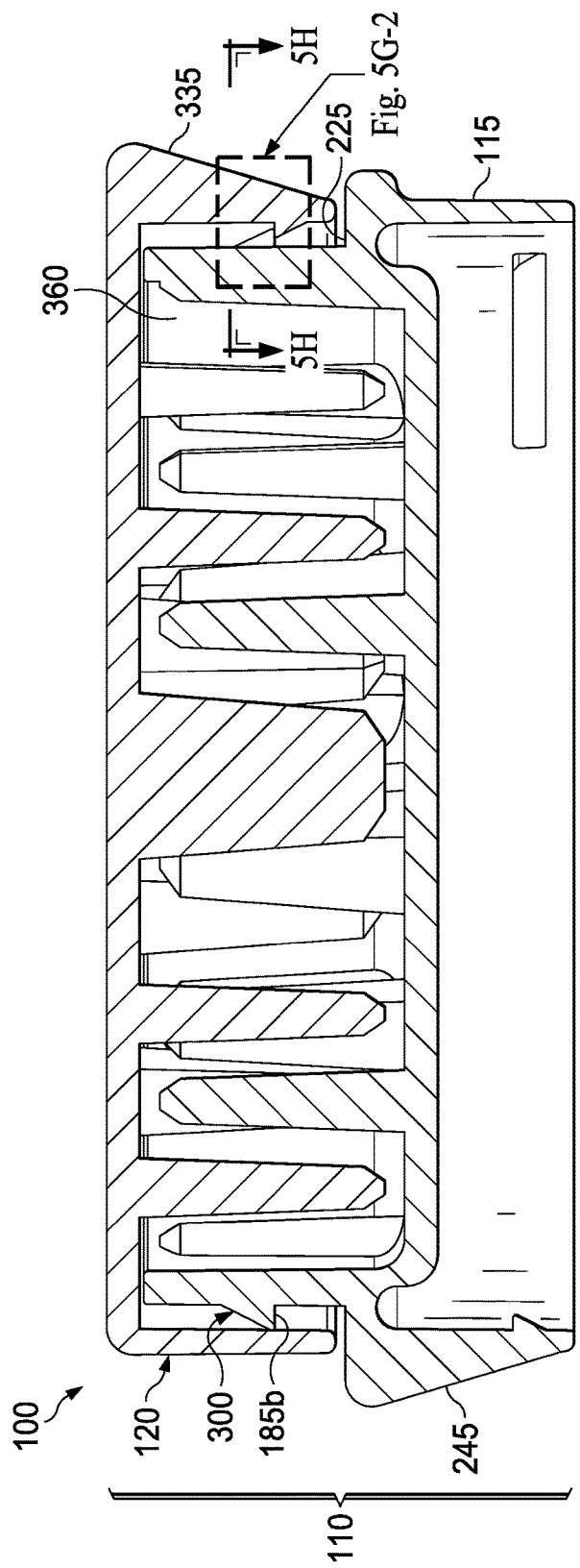
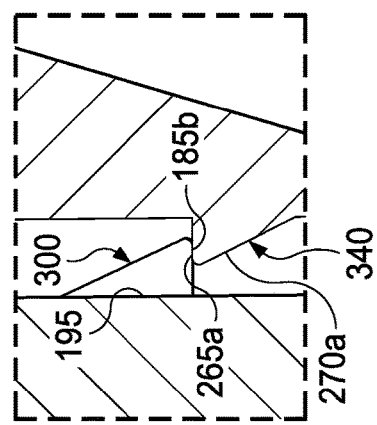
Fig. 5G-1
Fig. 5G-2

CONTAINER APPARATUS

CROSS-REFERENCE TO RELATED APPLICATIONS

This application is a continuation of U.S. application Ser. No. 16/598,443, filed Oct. 10, 2019, the entire disclosure of which is hereby incorporated herein by reference.

This application is a continuation of U.S. Application Ser. No. 29/708,953, filed Oct. 10, 2019, the entire disclosure of which is hereby incorporated herein by reference.

TECHNICAL FIELD

The present application relates generally to containers, and, more particularly, to containers and grinders.

BRIEF DESCRIPTION OF THE DRAWINGS

FIG. 2C is a front view of a portion of the container body of FIGS. 1A and 1B, according to one or more embodiments of the present disclosure.

FIG. 4H is a cross-sectional view of the top member of the container lid of FIGS. 1A and 1B taken along the line 4H-4H of FIG. 4C, according to one or more embodiments of the present disclosure.

FIG. 5A-2 is an enlarged view of a portion of FIG. 5A-1, according to one or more embodiments of the present disclosure.

FIG. 5C-1 is a cross-sectional view of a portion of the container apparatus of FIG. 5B in the second operational state or configuration taken along the line 5C-5C in FIG. 5B, according to one or more embodiments of the present disclosure.

FIG. 5C-2 is an enlarged view of a portion of FIG. 5C-1, according to one or more embodiments of the present disclosure.

FIG. 5G-1 is a cross-sectional view of a portion of the container apparatus of FIG. 5F in the fourth operational state or configuration taken along the line 5G-5G in FIG. 5F, according to one or more embodiments of the present disclosure.

FIG. 5G-2 is an enlarged view of a portion of FIG. 5G-1, according to one or more embodiments of the present disclosure.

DETAILED DESCRIPTION

Figure 1A:
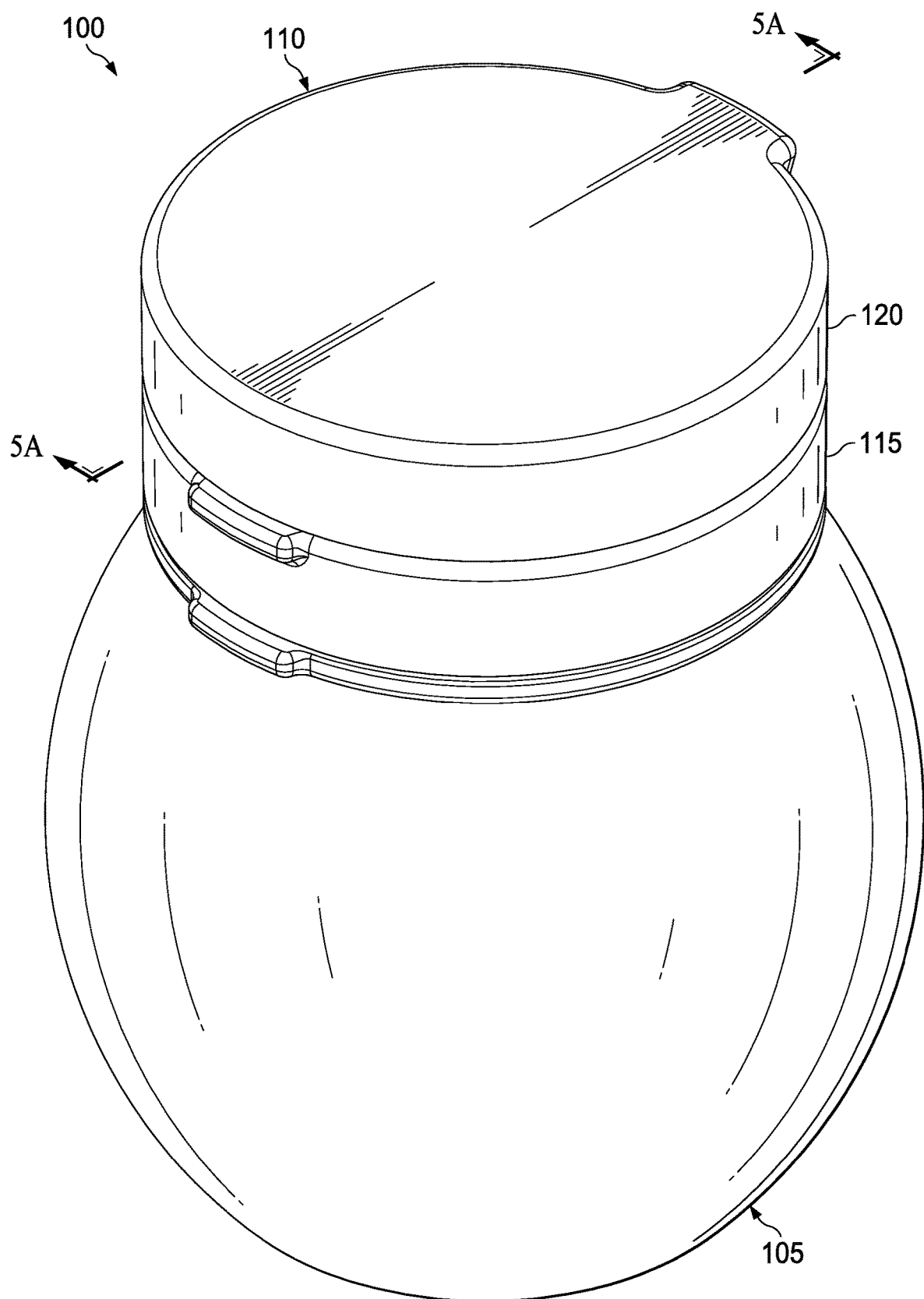
FIG. 1A is a top-front-right perspective view of a container apparatus in a first operational state or configuration, the container apparatus including a container body and a container lid, the container lid including a bottom member and a top member, according to one or more embodiments of the present disclosure.
Figure 1B:
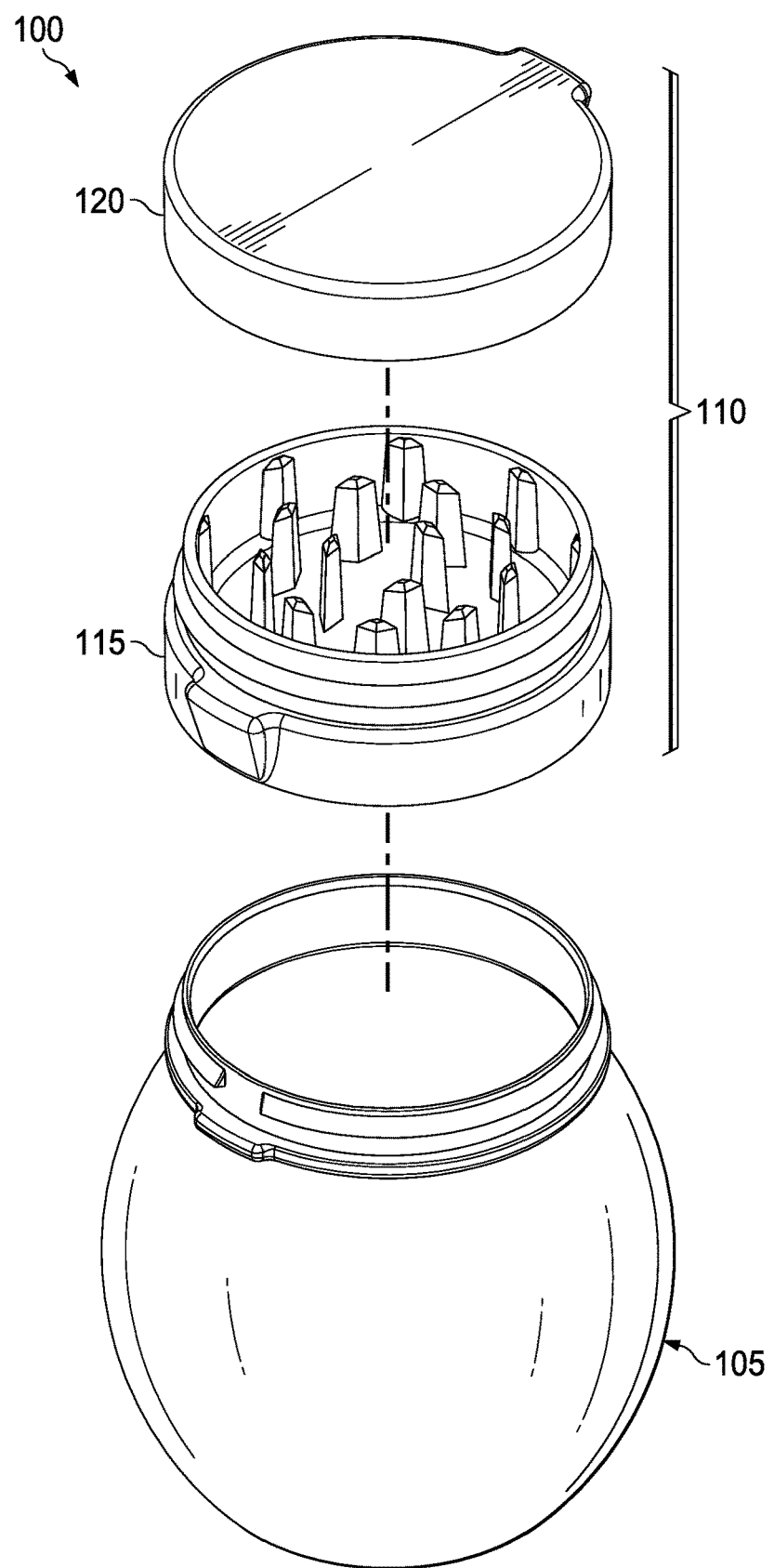
FIG. 1B is an exploded top-front-right perspective view of the container apparatus of FIG. 1A, according to one or more embodiments of the present disclosure.
Figure 2A:
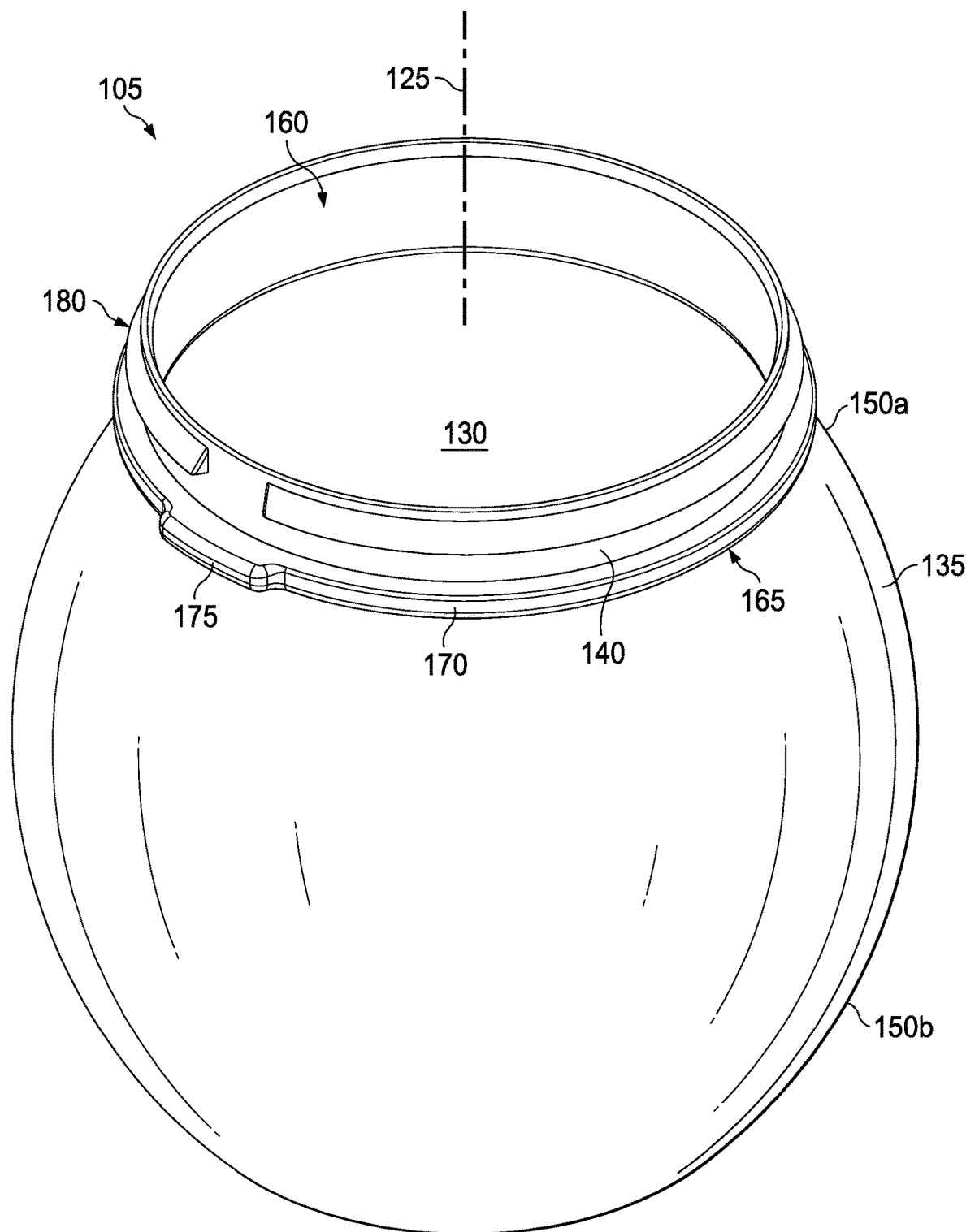
FIG. 2A is a top-front-right front perspective view of the container body of FIGS. 1A and 1B, according to one or more embodiments of the present disclosure.
Figure 2B:
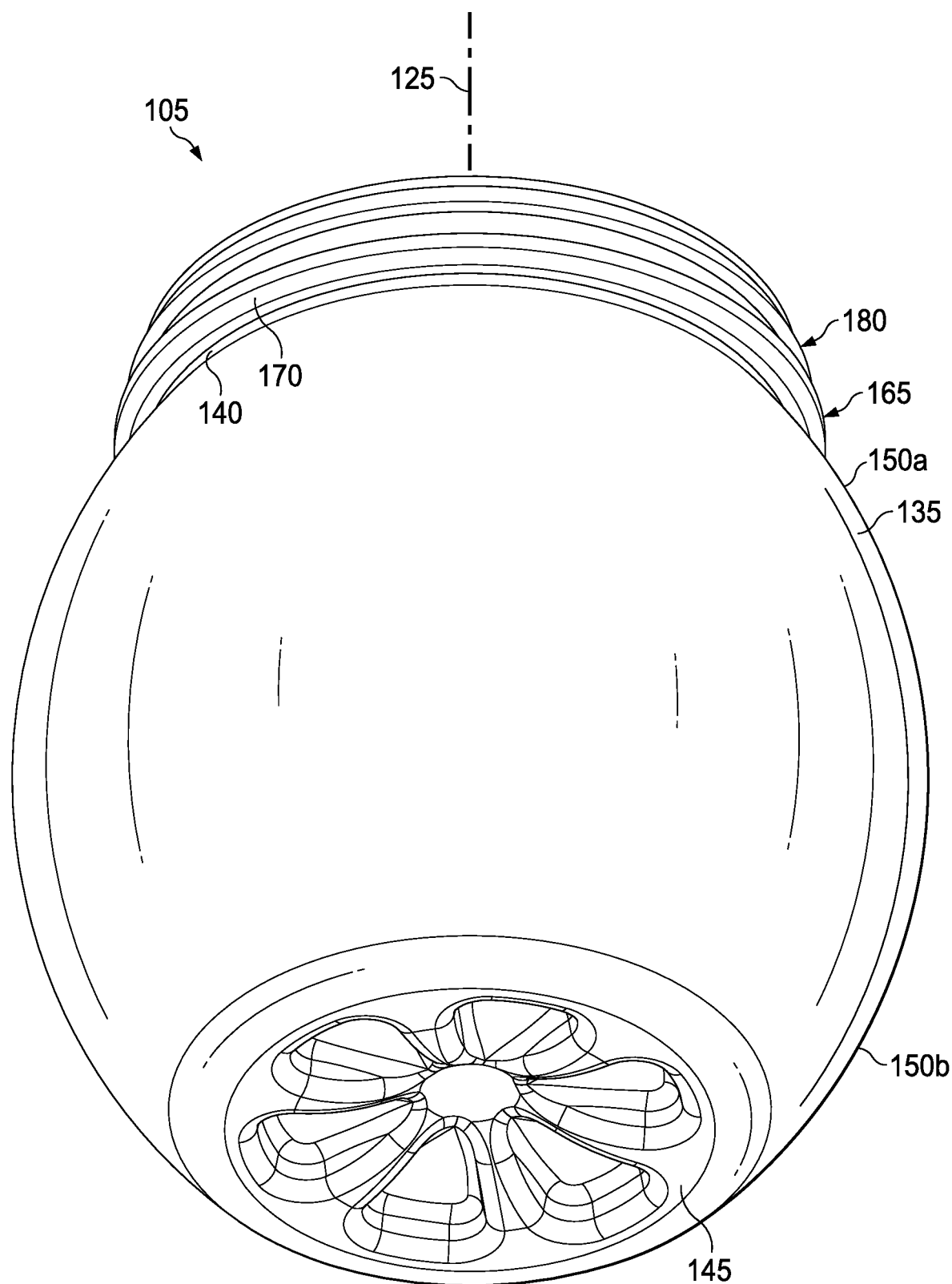
FIG. 2B is a bottom-rear-left perspective view of the container body of FIGS. 1A and 1B, according to one or more embodiments of the present disclosure.
Figure 2D:
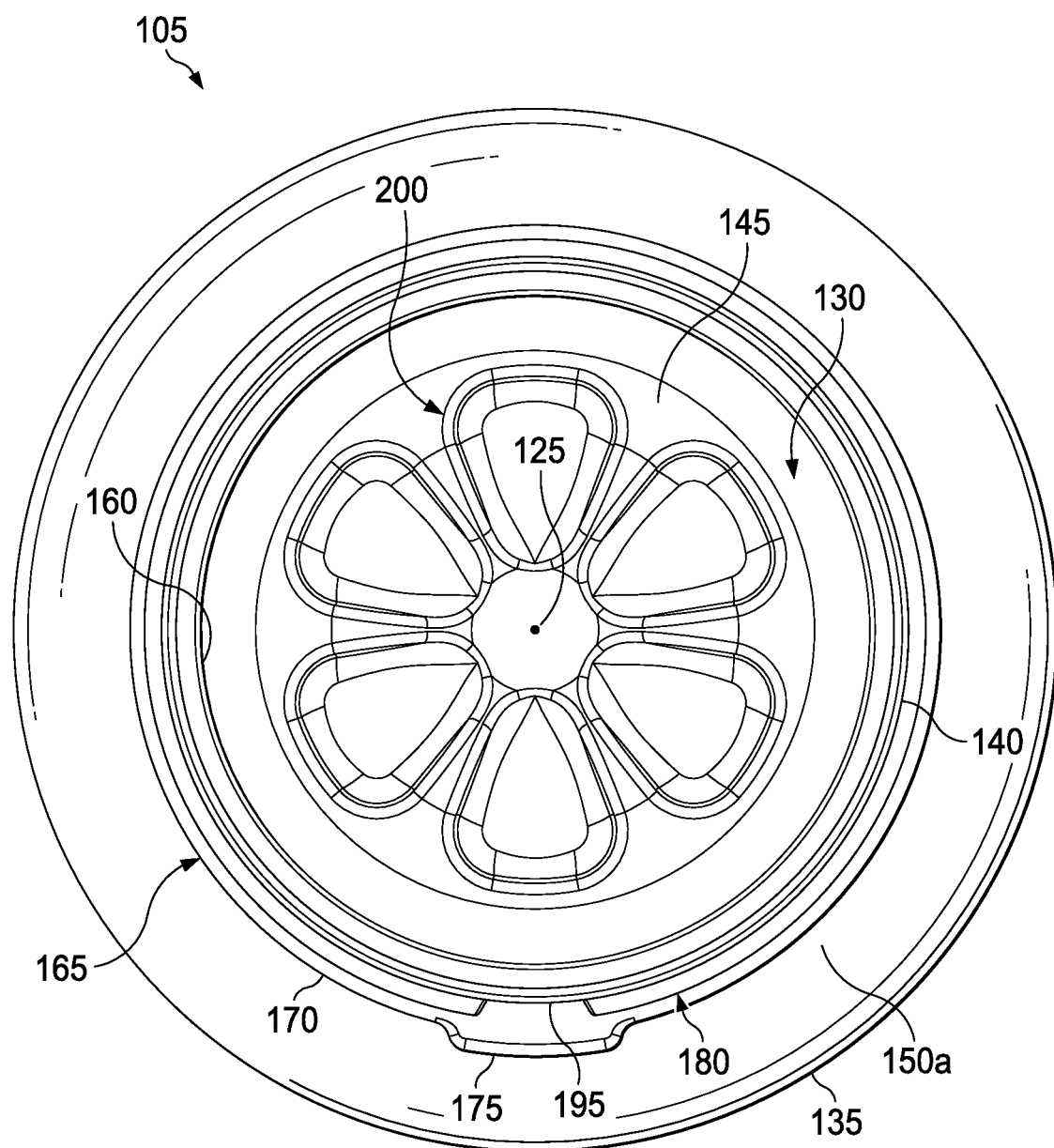
FIG. 2D is a top view of the container body of FIGS. 1A and 1B, according to one or more embodiments of the present disclosure.
Figure 2E:
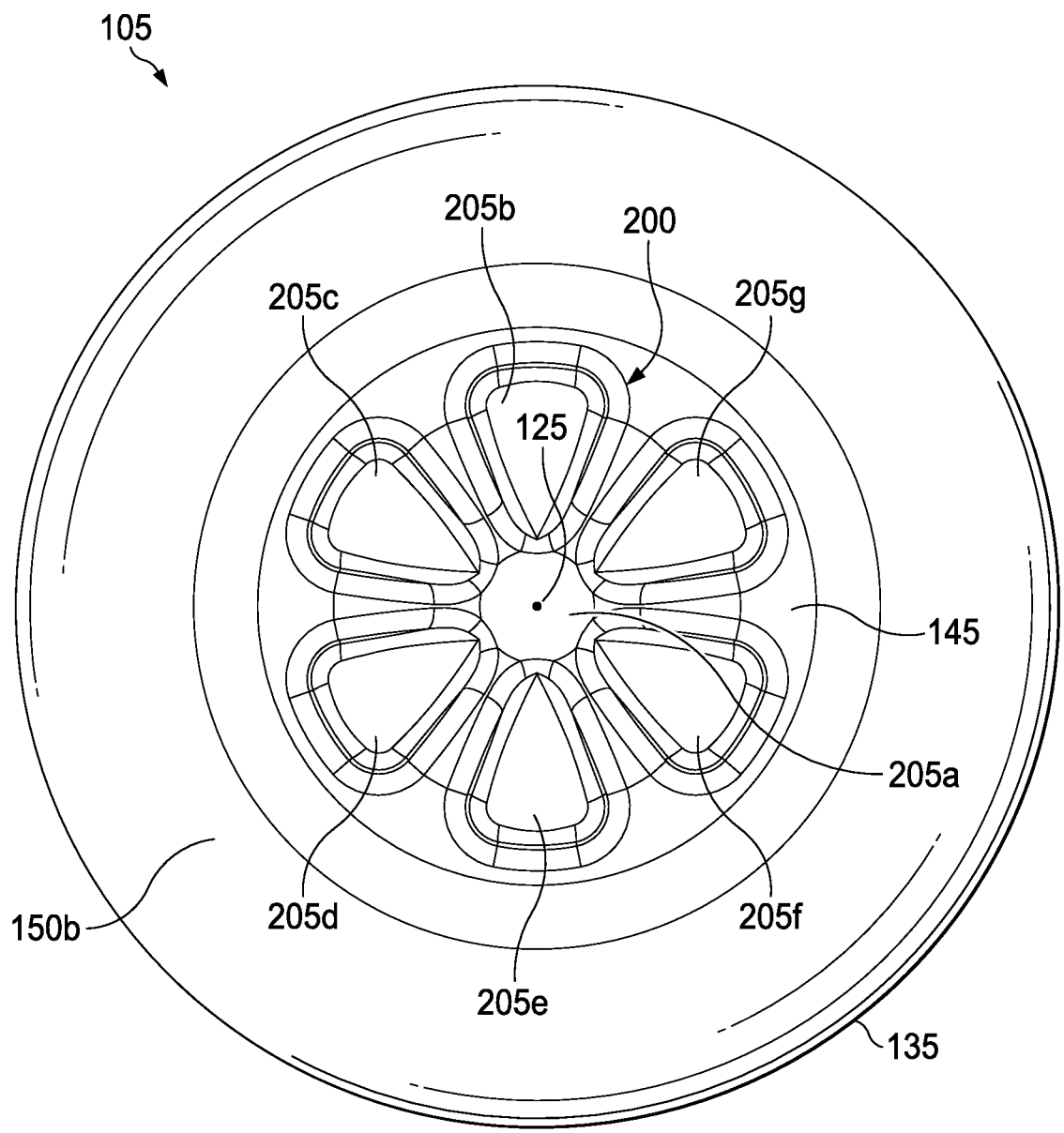
FIG. 2E is a bottom view of the container body of FIGS. 1A and 1B, according to one or more embodiments of the present disclosure.
Figure 3A:
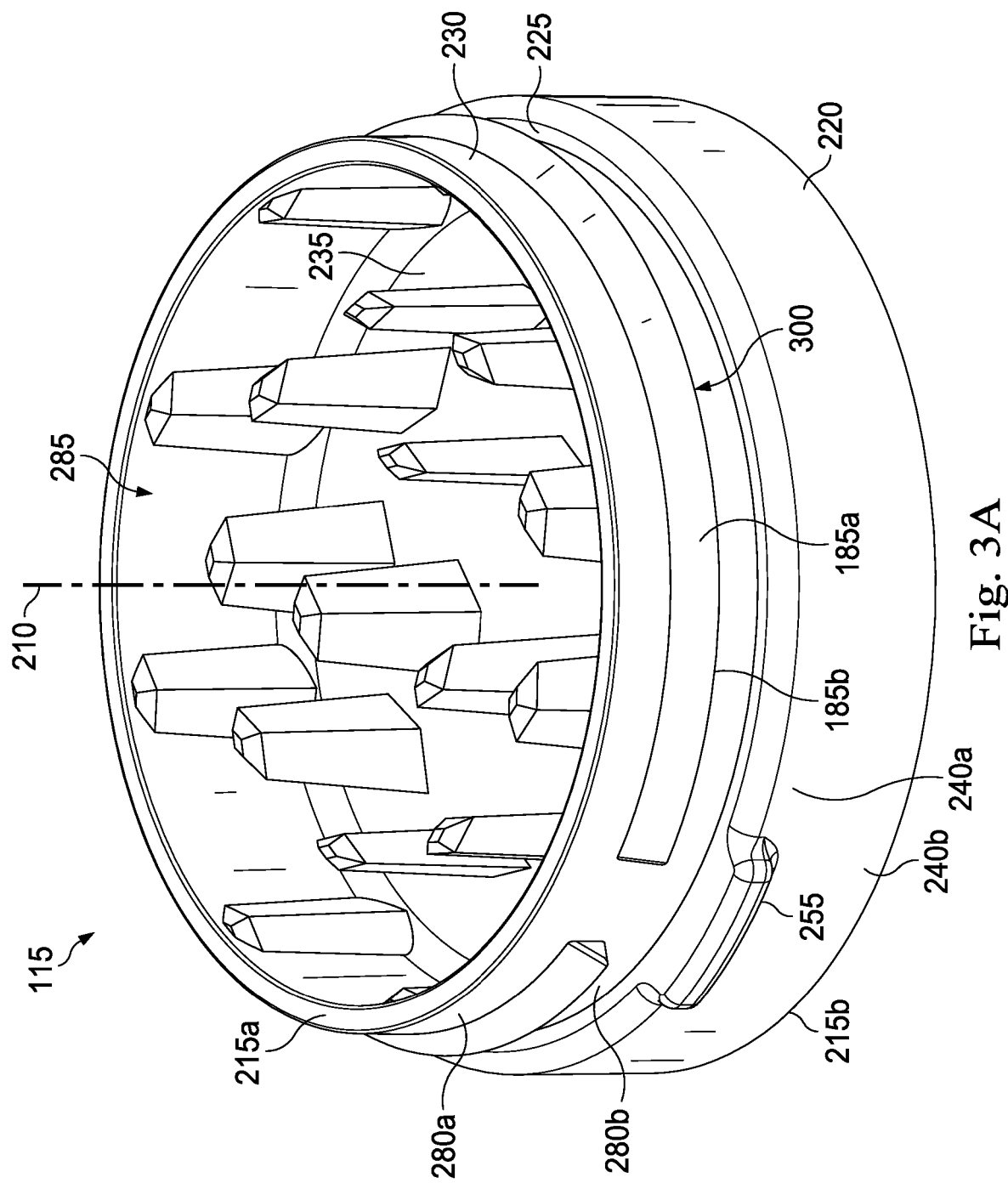
FIG. 3A is a top-front-right perspective view of a bottom member of the container lid of FIGS. 1A and 1B, according to one or more embodiments of the present disclosure.
Figure 3B:
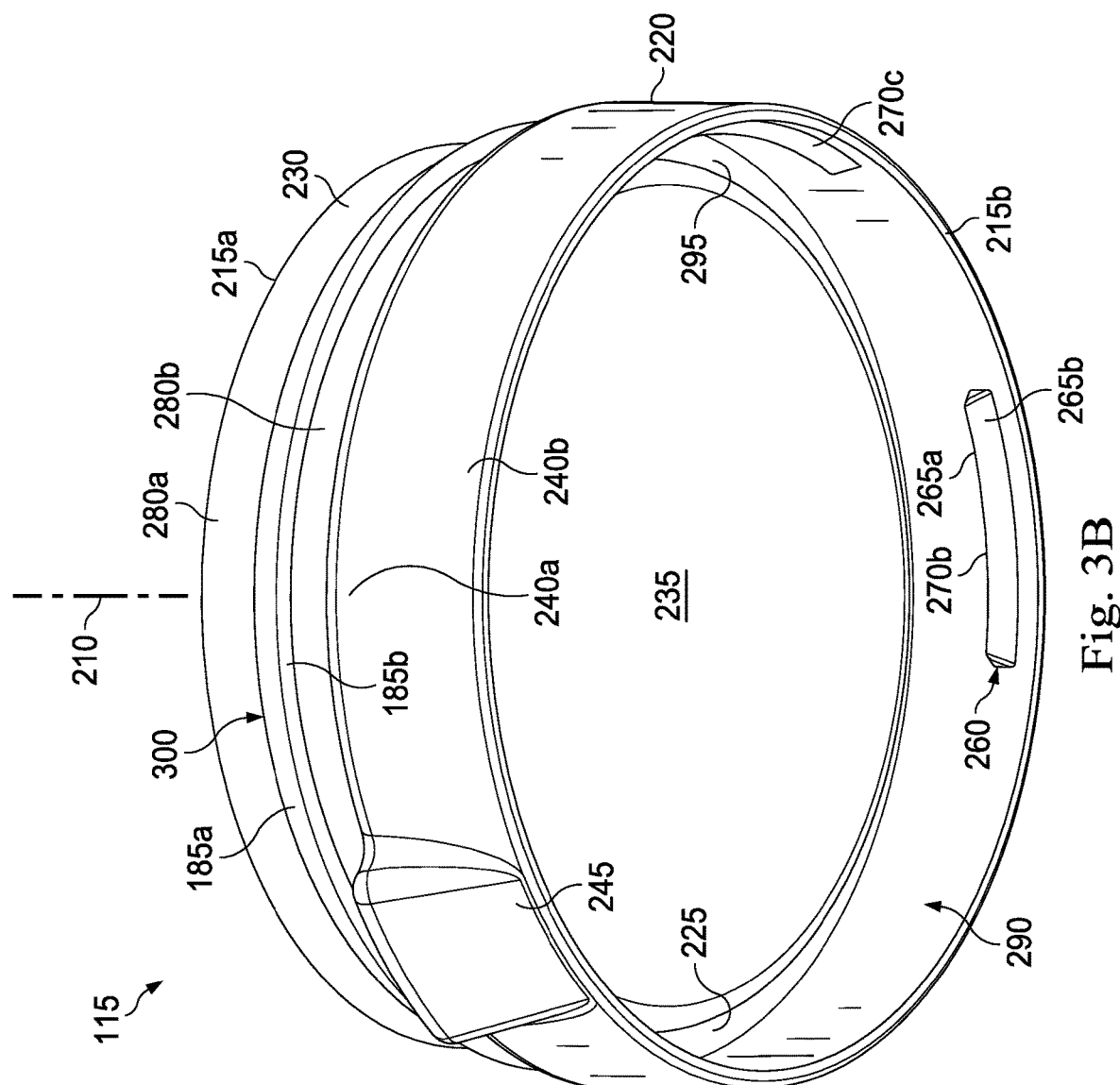
FIG. 3B is a bottom-rear-left perspective view of the bottom member of the container lid of FIGS. 1A and 1B, according to one or more embodiments of the present disclosure.
Figure 3C:
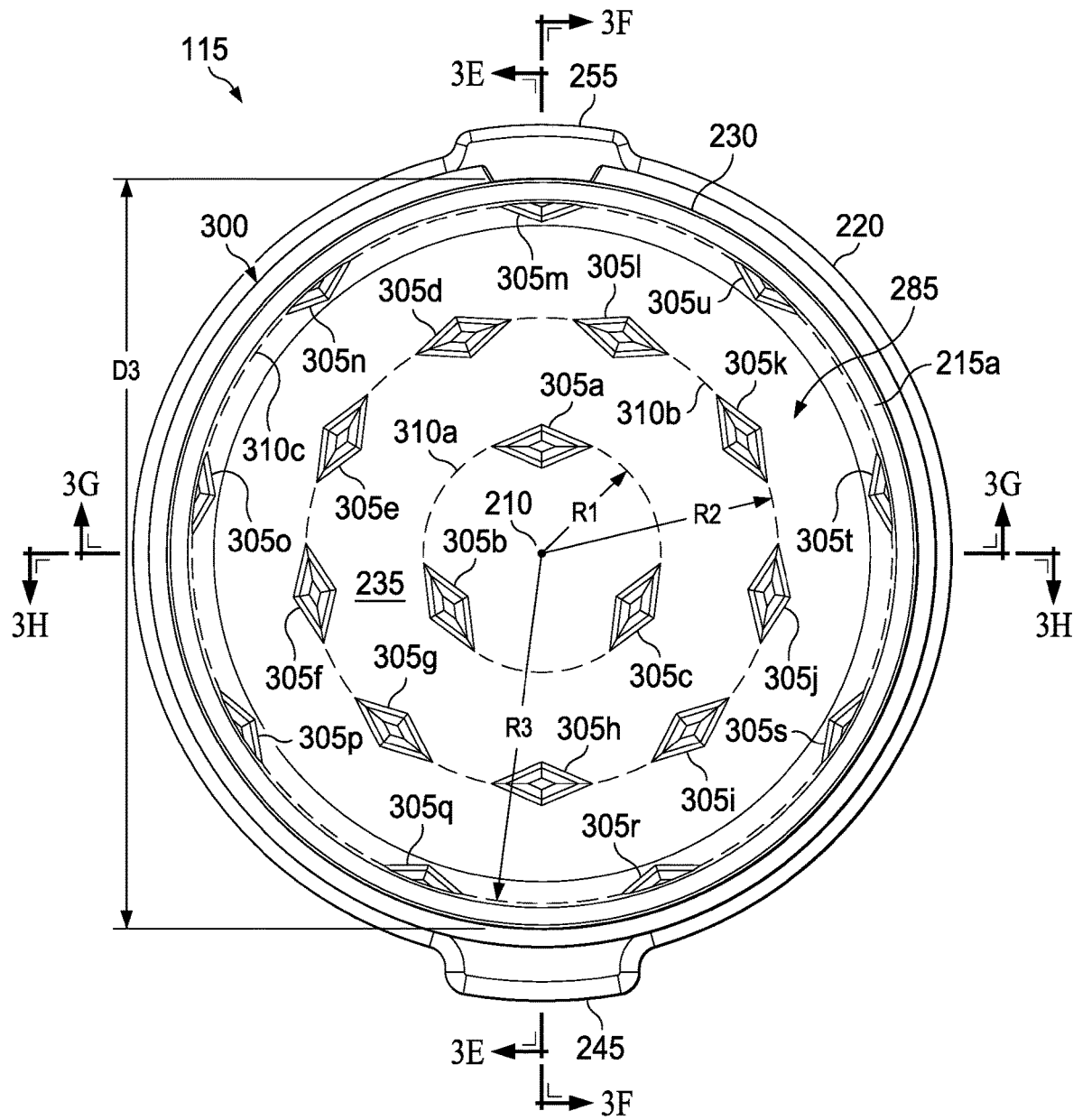
FIG. 3C is a top view of the bottom member of the container lid of FIGS. 1A and 1B, according to one or more embodiments of the present disclosure.
Figure 3D:
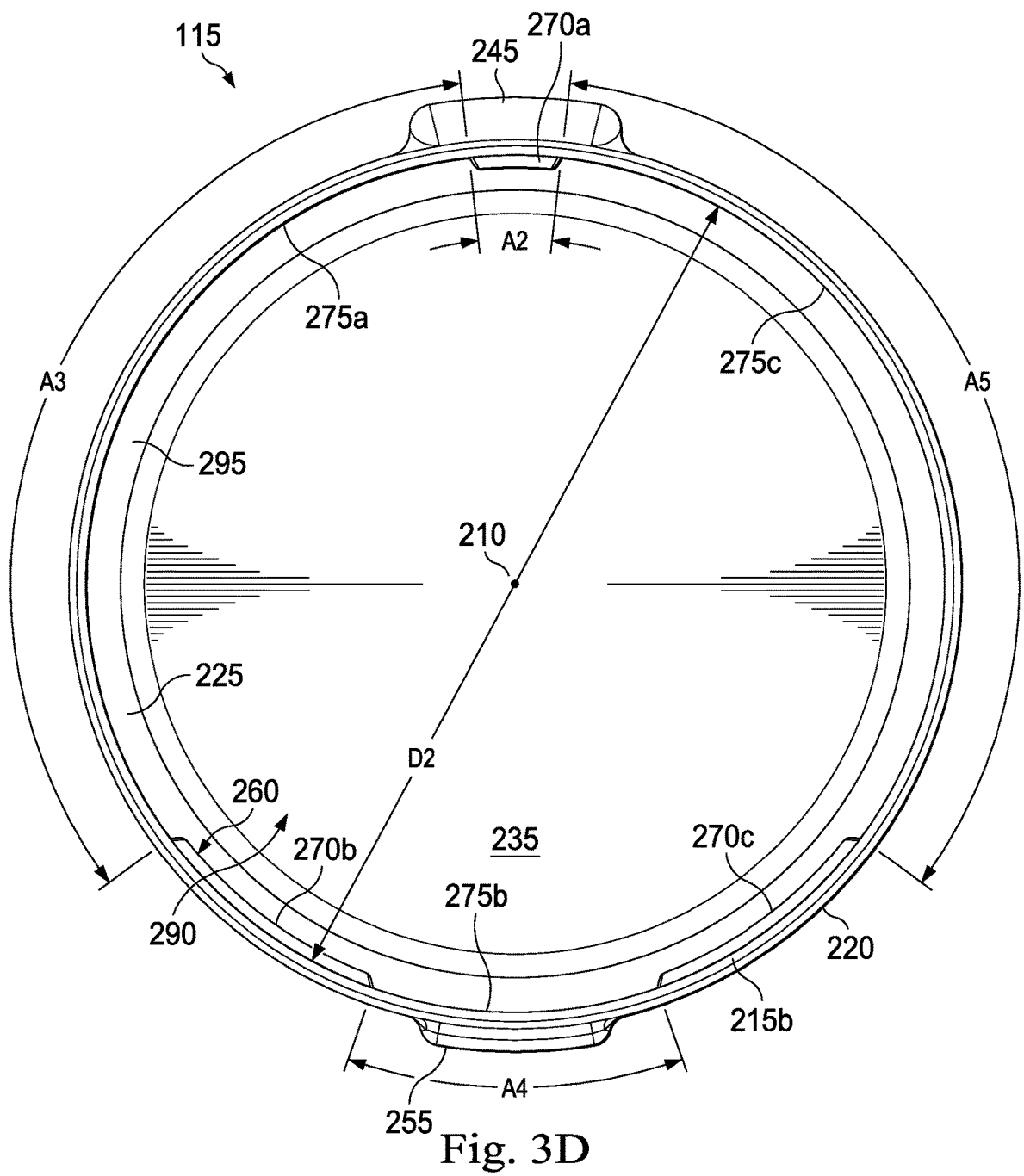
FIG. 3D is a bottom view of the bottom member of the container lid of FIGS. 1A and 1B, according to one or more embodiments of the present disclosure.
Figure 3E:
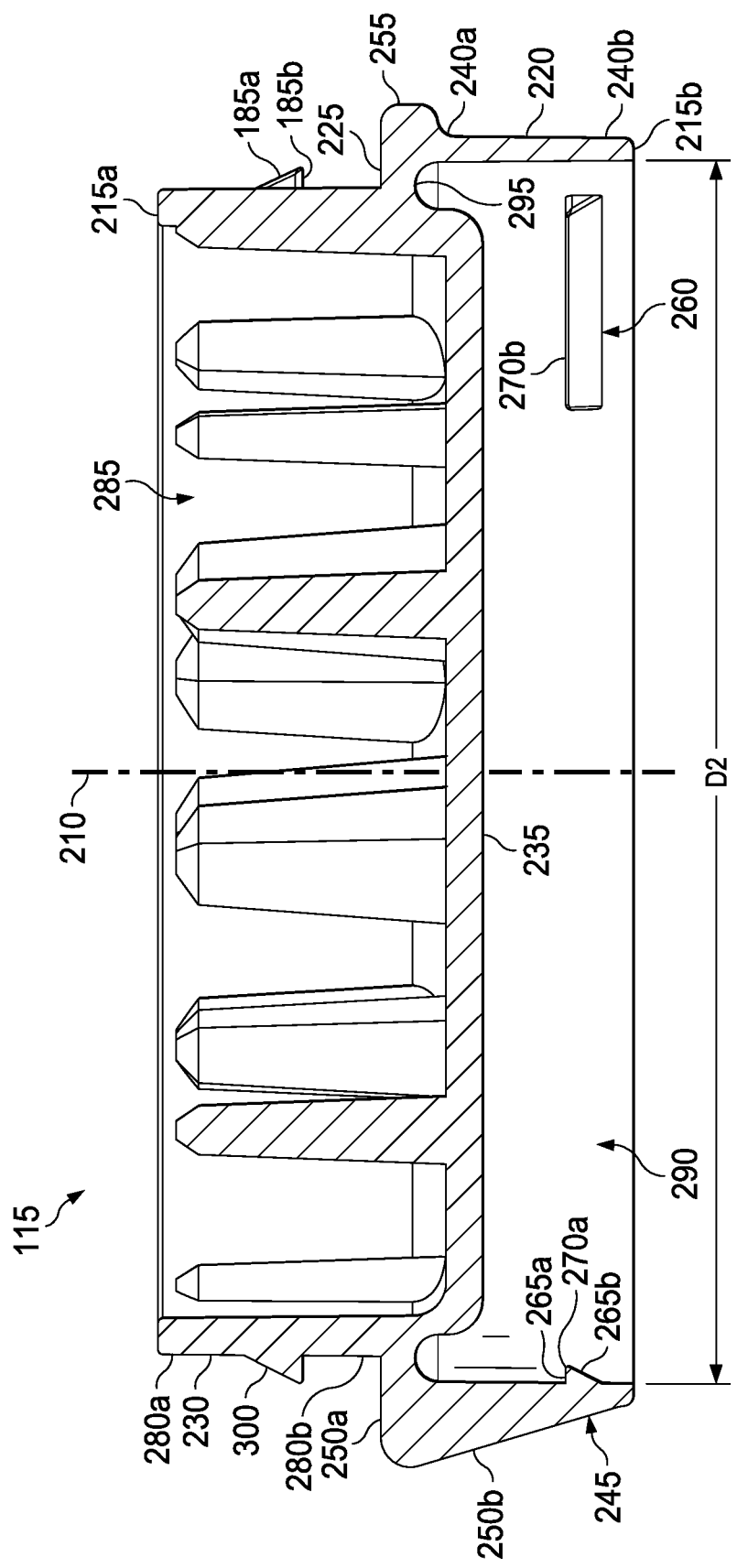
FIG. 3E is a cross-sectional view of the bottom member of the container lid of FIGS. 1A and 1B taken along the line 3E-3E of FIG. 3C, according to one or more embodiments of the present disclosure.
Figure 3F:
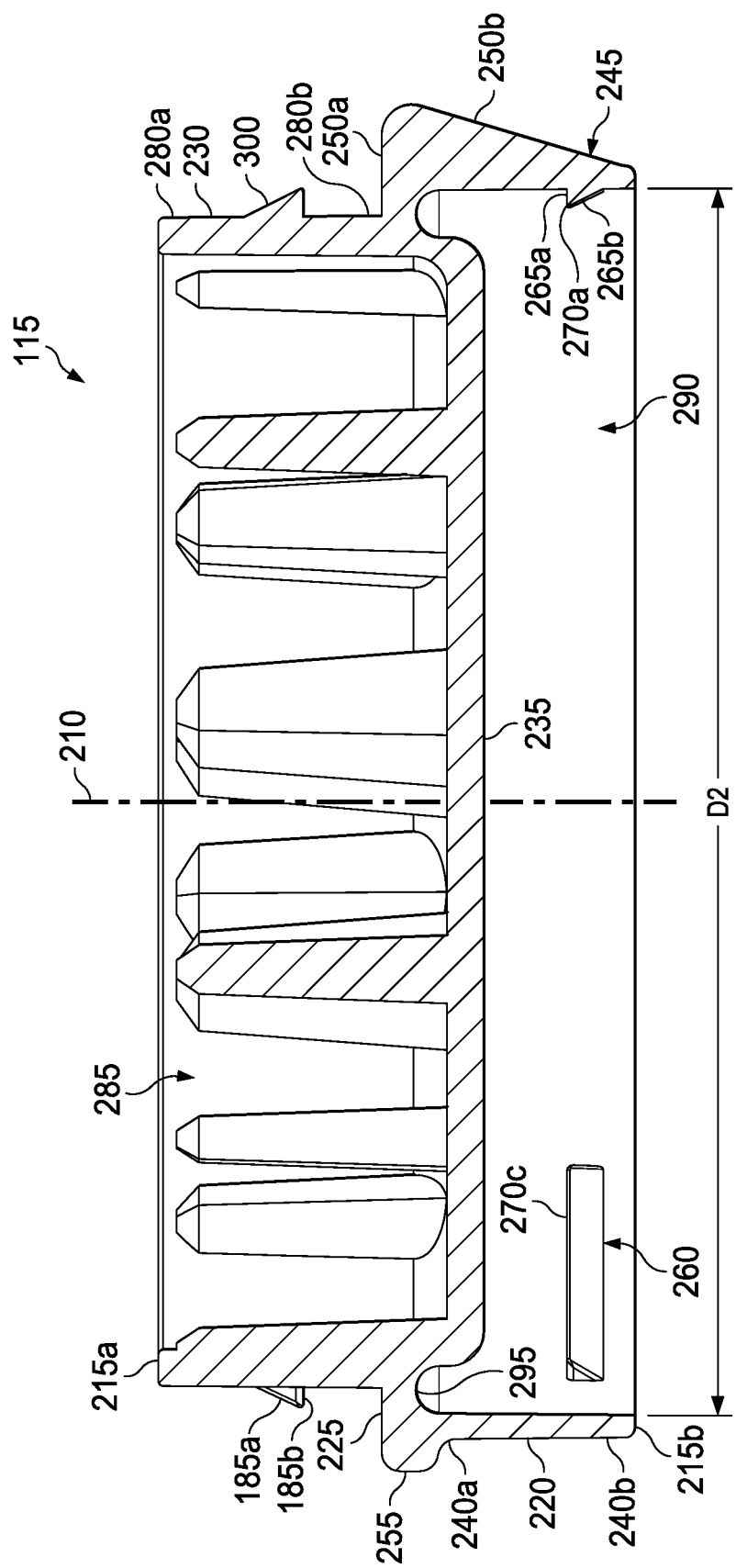
FIG. 3F is a cross-sectional view of the bottom member of the container lid of FIGS. 1A and 1B taken along the line 3F-3F of FIG. 3C, according to one or more embodiments of the present disclosure.
Figure 3G:
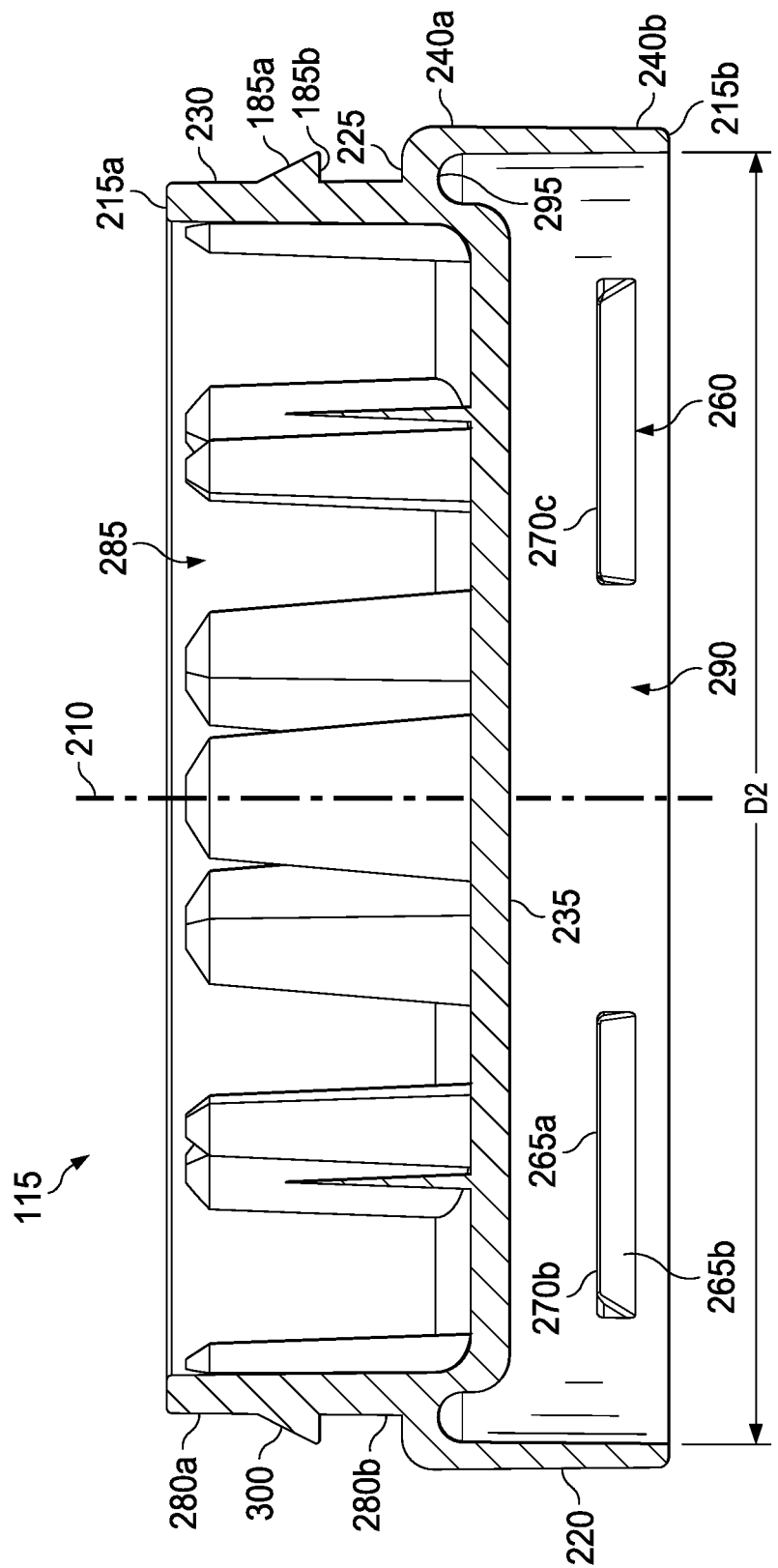
FIG. 3G is a cross-sectional view of the bottom member of the container lid of FIGS. 1A and 1B taken along the line 3G-3G of FIG. 3C, according to one or more embodiments of the present disclosure.
Figure 3H:
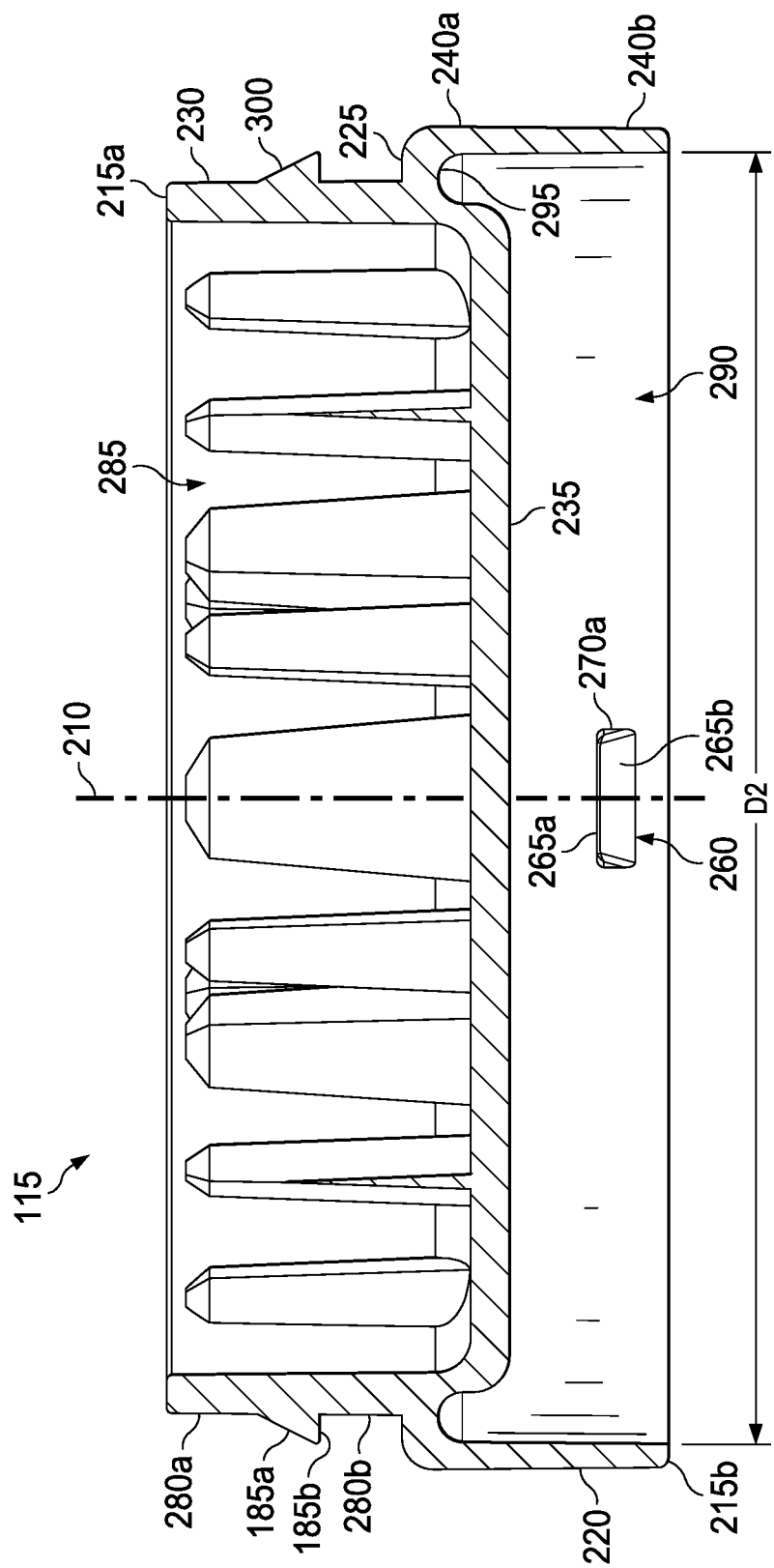
FIG. 3H is a cross-sectional view of the bottom member of the container lid of FIGS. 1A and 1B taken along the line 3H-3H of FIG. 3C, according to one or more embodiments of the present disclosure.
Figure 4A:
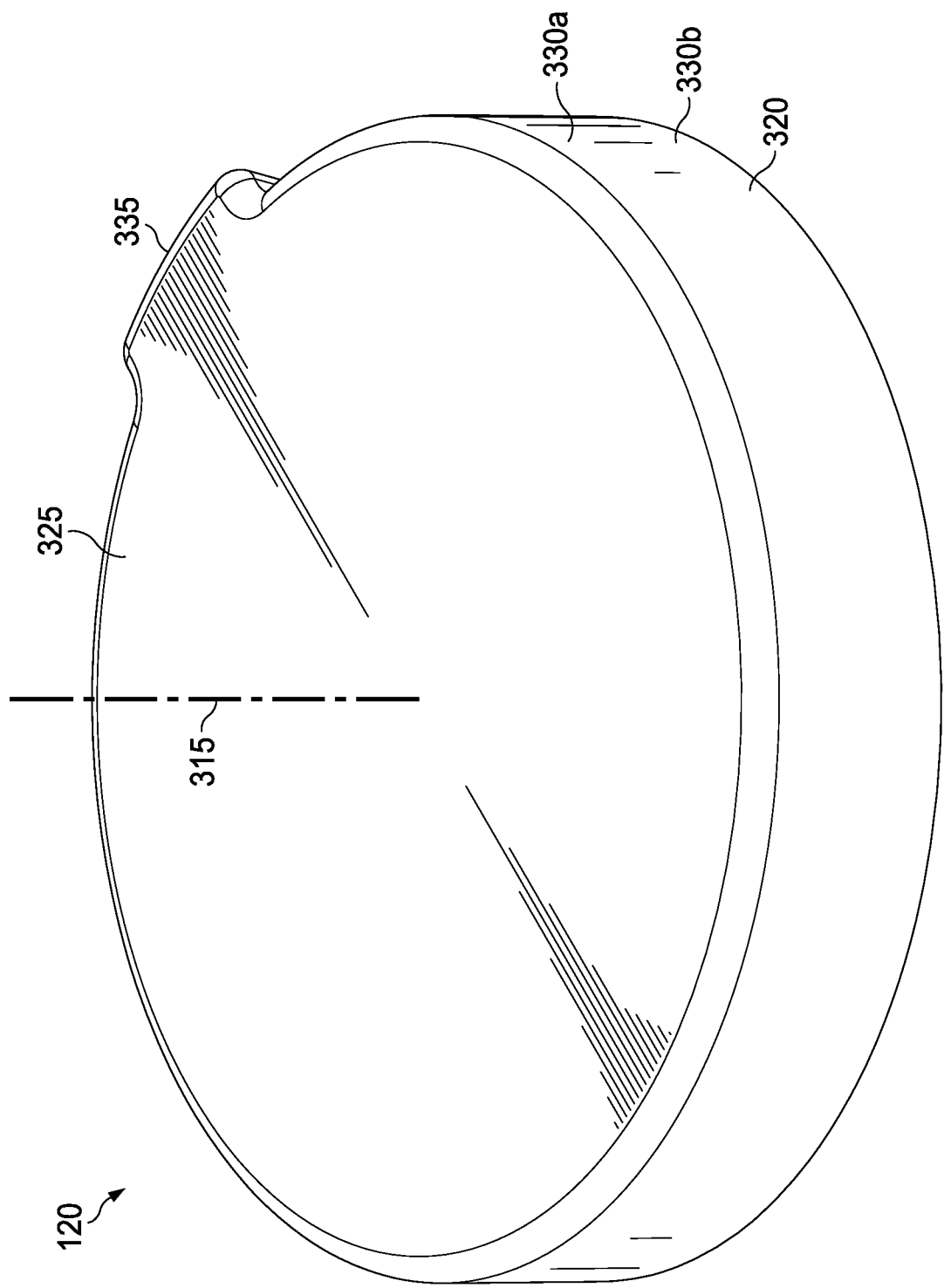
FIG. 4A is a top-front-right perspective view of a top member of the container lid of FIGS. 1A and 1B, according to one or more embodiments of the present disclosure.
Figure 4B:
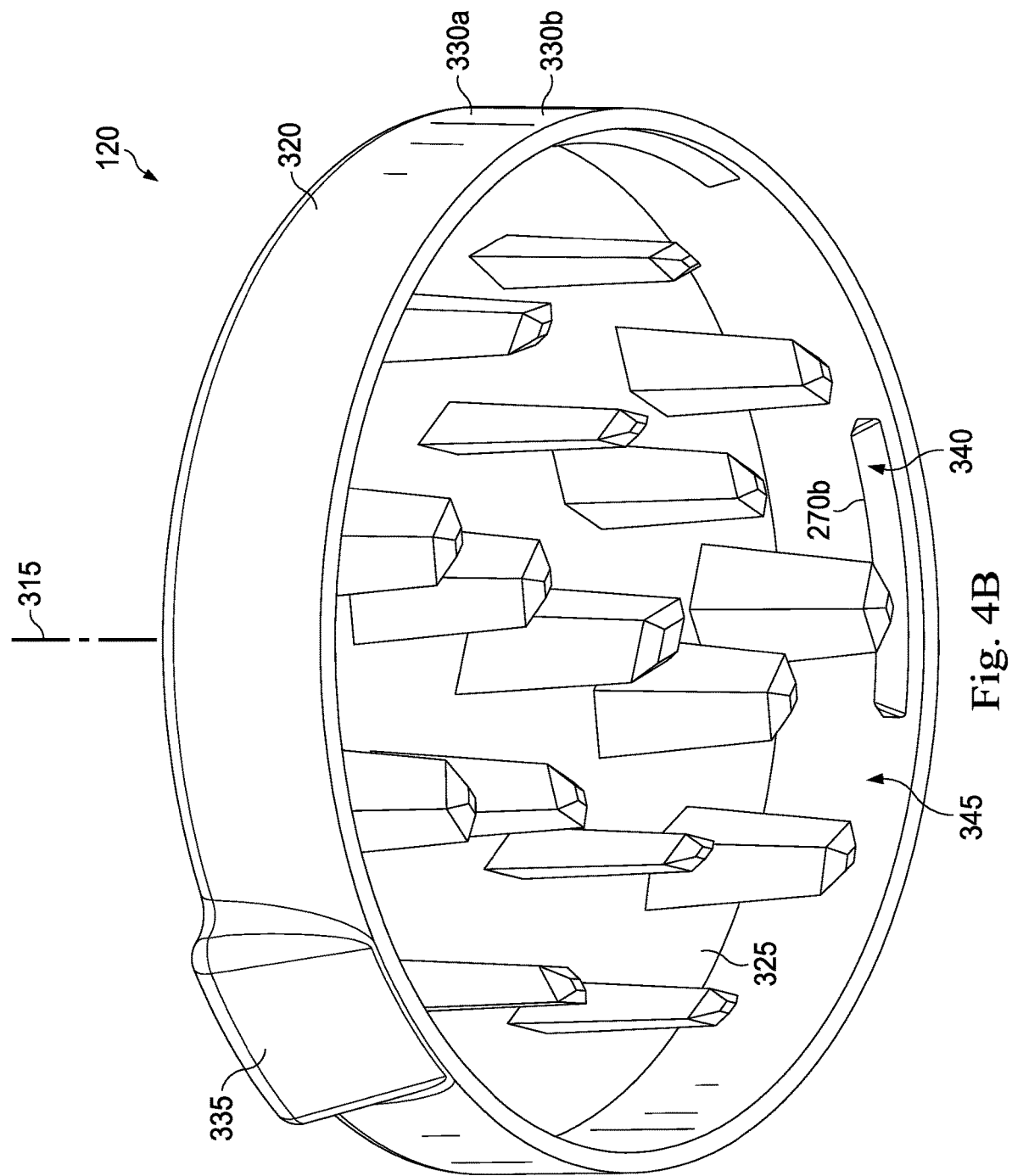
FIG. 4B is a bottom-rear-left perspective view of the top member of the container lid of FIGS. 1A and 1B, according to one or more embodiments of the present disclosure.
Figure 4C:
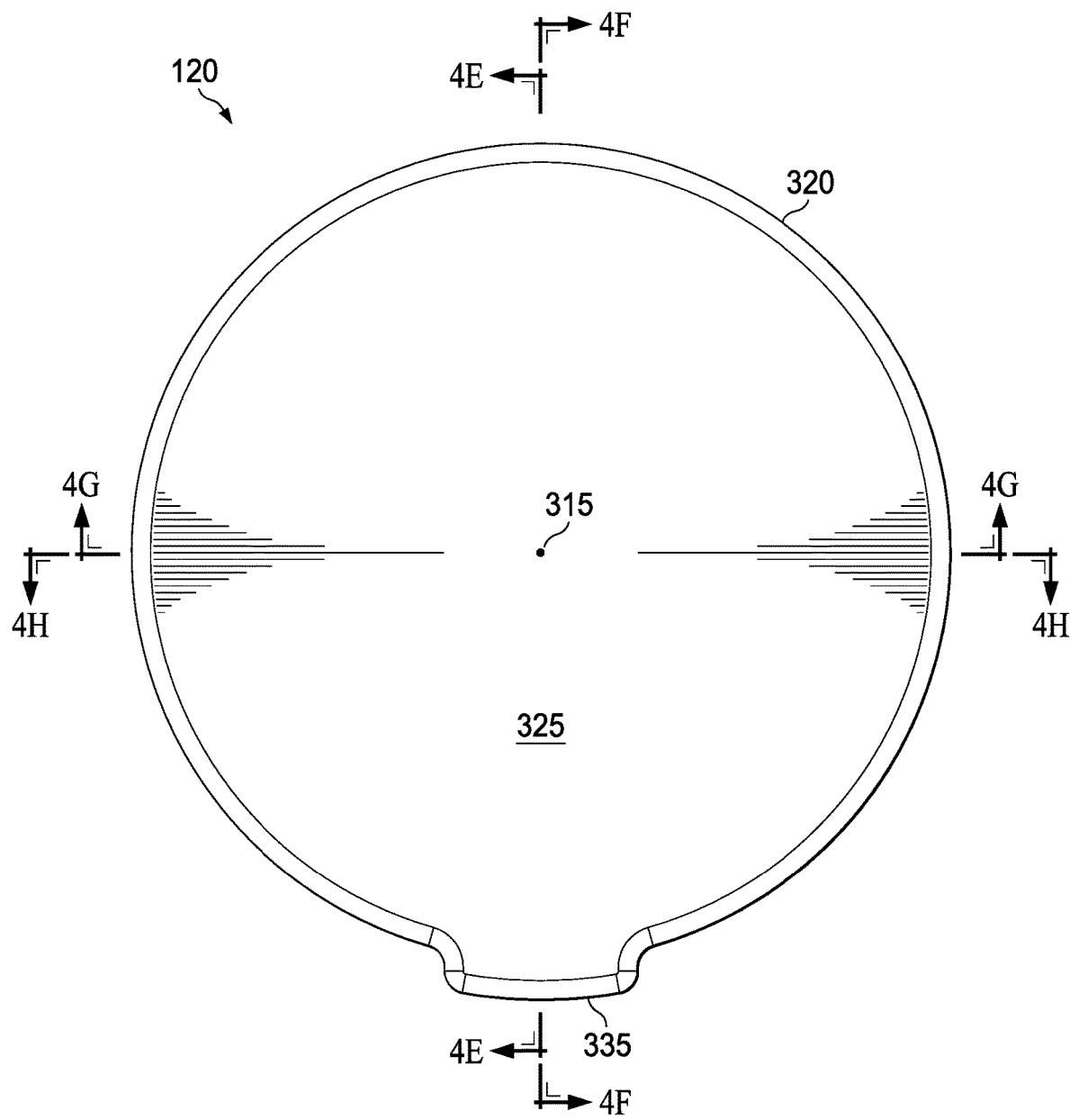
FIG. 4C is a top view of the top member of the container lid of FIGS. 1A and 1B, according to one or more embodiments of the present disclosure.
Figure 4D:
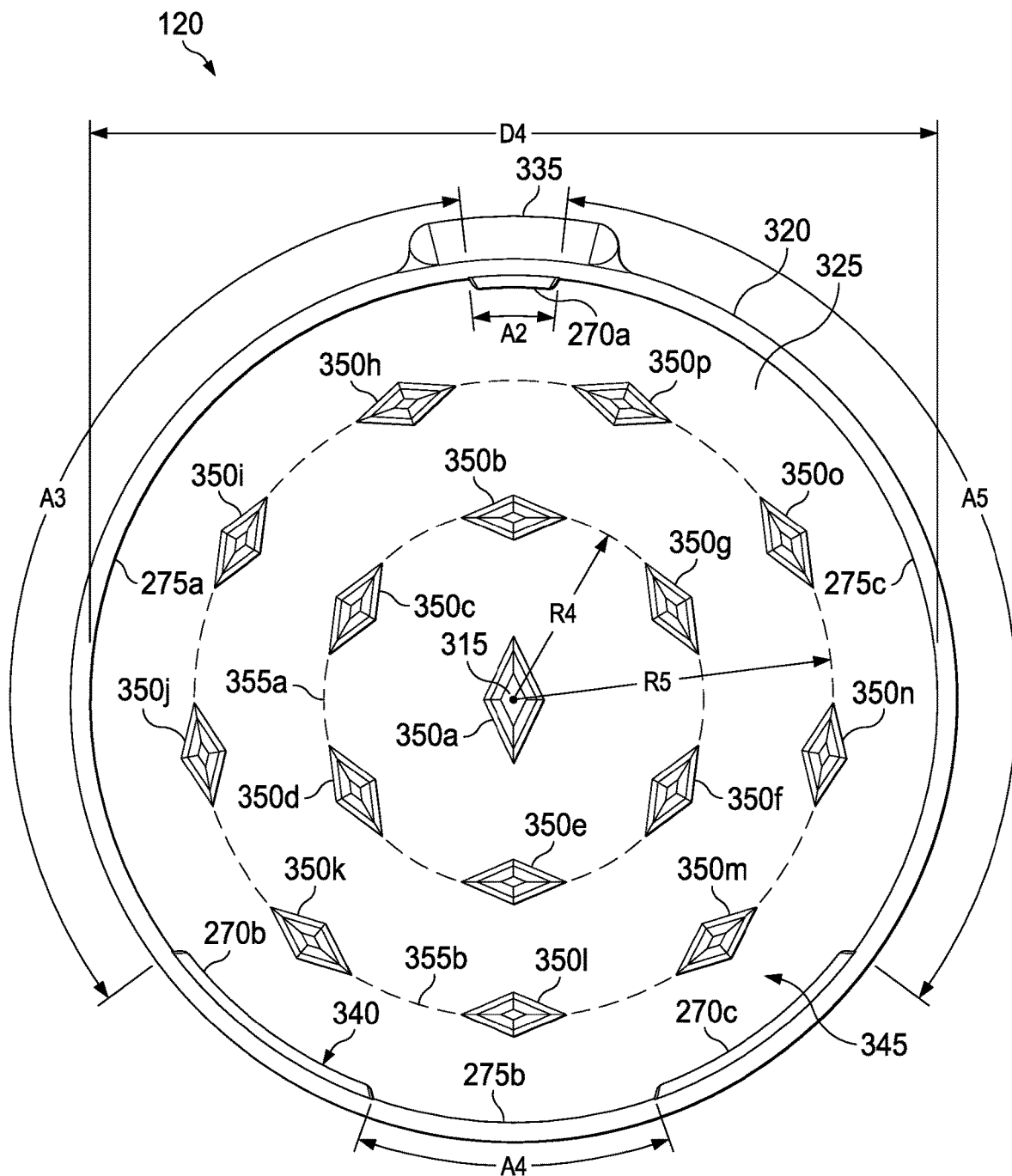
FIG. 4D is a bottom view of the top member of the container lid of FIGS. 1A and 1B, according to one or more embodiments of the present disclosure.
Figure 4E:
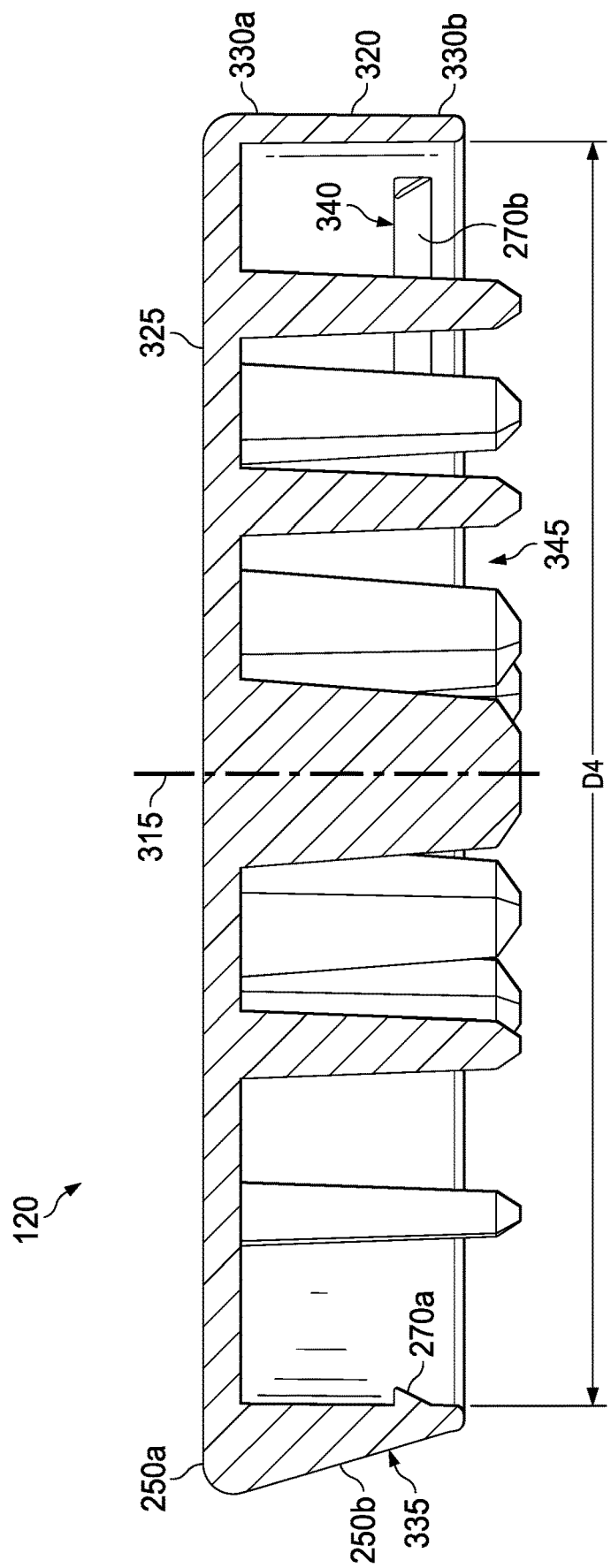
FIG. 4E is a cross-sectional view of the top member of the container lid of FIGS. 1A and 1B taken along the line 4E-4E of FIG. 4C, according to one or more embodiments of the present disclosure.
Figure 4F:
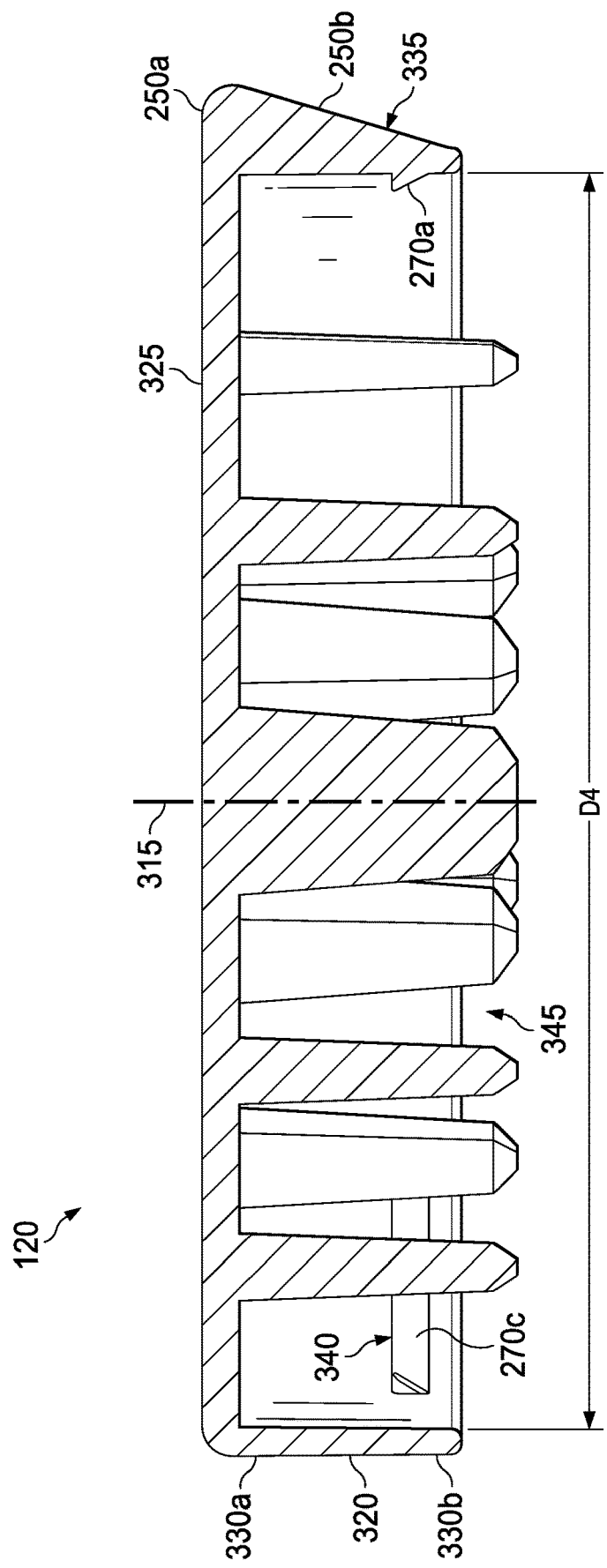
FIG. 4F is a cross-sectional view of the top member of the container lid of FIGS. 1A and 1B taken along the line 4F-4F of FIG. 4C, according to one or more embodiments of the present disclosure.
Figure 4G:
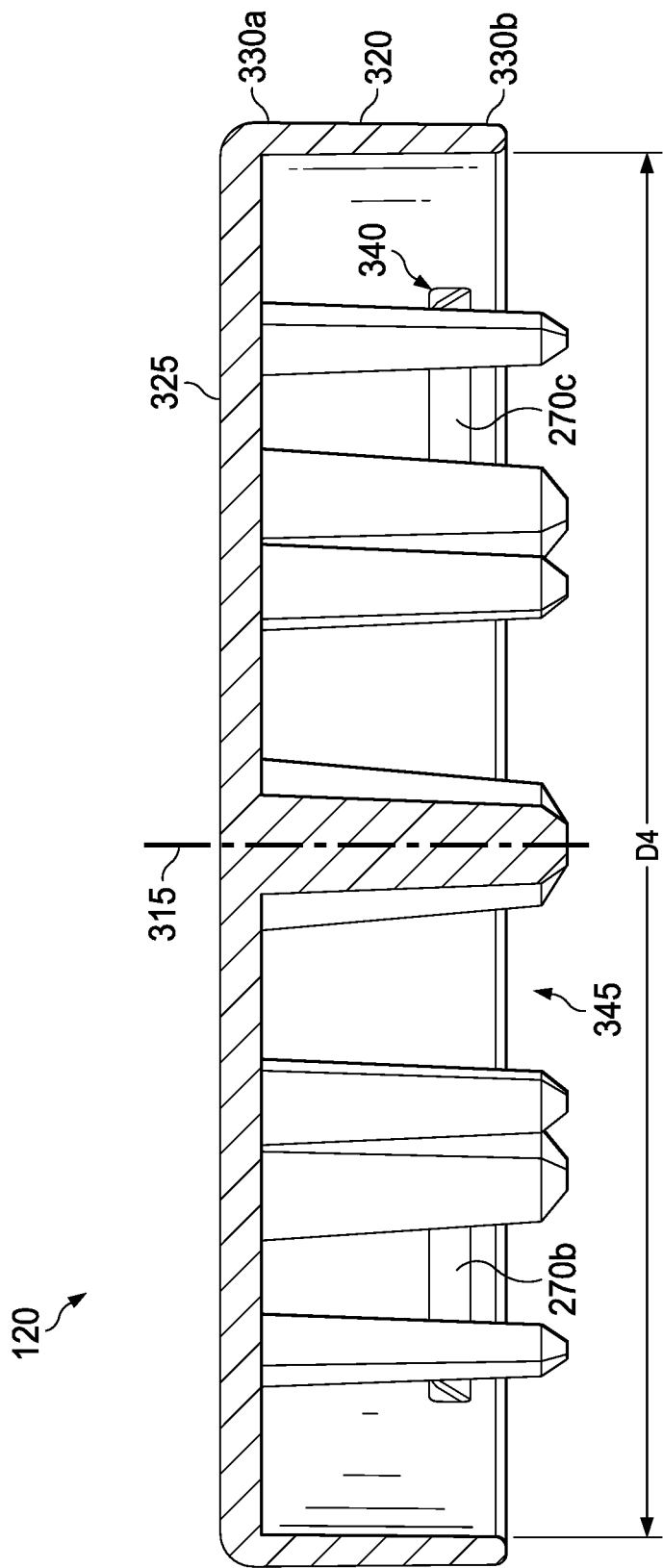
FIG. 4G is a cross-sectional view of the top member of the container lid of FIGS. 1A and 1B taken along the line 4G-4G of FIG. 4C, according to one or more embodiments of the present disclosure.

Referring to FIGS. 1A and 1B, in an embodiment, a container apparatus is generally referred to by the reference numeral 100. The container apparatus 100 includes a container body 105 and a container lid 110. The container lid 110 includes a bottom member 115 and a top member 120.

Referring to FIGS. 2A-2E, in an embodiment, the container body 105 extends along a central axis 125 and defines an internal cavity 130. The container body 105 includes a side wall 135, a neck 140, and a bottom wall 145. As shown in FIGS. 2A-2E, the side wall 135 is frustospherical or frustospheroidal, that is, in the shape of a truncated sphere or a truncated spheroid. In addition, or instead, the side wall 135 (or a portion thereof) may be or include another curved shape, a cylindrical shape, a tapered shape (e.g., a frustoconical shape), another shape, or a combination thereof. The side wall 135 defines axially opposing end portions 150a and 150b. In some embodiments, the neck 140 is cylindrical. The neck 140 defines an outer diameter D1, axially opposing end portions 155a and 155b, and a mouth 160 via which the internal cavity 130 of the container body 105 is accessible. The end portion 155b of the neck 140 is connected to the side wall 135 at the end portion 155a of the side wall 135. An external collar 165 extends around the neck 140. The external collar 165 includes an external ring 170 extending radially outwardly from the neck 140 and an external alignment tab 175 extending radially outwardly from the external ring 170.

An external ridge 180 also extends around the neck 140. The external ridge 180 is positioned farther from the side wall 135 than the external collar 165. The external ridge 180 includes axially opposing ridge faces 185a and 185b extending radially outwardly from the neck 140. The ridge face 185b is perpendicular to the central axis 125 and is positioned nearer to the side wall 135 than the ridge face 185a. The ridge face 185a is tapered (e.g., frustoconical) and is positioned farther from the side wall 135 than the ridge face 185b. In some embodiments, the ridge faces 185a and 185b adjoin each other. Alternatively, the ridge faces 185a and 185b may each adjoin an intermediate surface (not shown) of the external ridge 180. The external ridge 180 defines circumferentially opposing end portions 190a and 190b. The circumferentially opposing end portions 190a and 190b are circumferentially spaced apart from each other by a gap 195 having a circumferential dimension A1. The bottom wall 145 is connected to the side wall 135 at the end portion 150b of the side wall 135. An external indentation pattern 200 is formed into the bottom wall 145. The external indentation pattern 200 includes a central indentation 205a and petal indentations 205b-g distributed (e.g., evenly) around the central indentation 205a.

Referring to FIGS. 3A-3H, in an embodiment, the bottom member 115 of the container lid 110 extends along a central axis 210 and defines axially opposing end portions 215a and 215b. The bottom member 115 of the container lid 110 includes a side wall 220, an end wall 225, a side wall 230, and a bottom wall 235. The end portion 215b of the bottom member 115 includes the side wall 220. In some embodiments, the side wall 220 is cylindrical. The side wall 220 defines an inner diameter D2 and axially opposing end portions 240a and 240b. The inner diameter D2 of the side wall 220 is greater than the outer diameter D1 of the neck 140. An external grip tab 245 extends radially outwardly from the side wall 220. The external grip tab 245 includes axially opposing surfaces 250a and 250b extending radially outwardly from the side wall 220. The surface 250a is perpendicular to the central axis 210 and is positioned nearer to the end portion 215a of the bottom member 115 than the surface 250b. The surface 250b is tapered (e.g., frustoconical) and is positioned farther from the end portion 215a of the bottom member 115 than the surface 250a. In some embodiments, the surfaces 250a and 250b adjoin each other. Alternatively, the surfaces 250a and 250b may each adjoin an intermediate surface (not shown) of the external grip tab 245. An external alignment tab 255 also extends radially outwardly from the side wall 220. In some embodiments, the external alignment tab 255 is located at the end portion 240a of the side wall 220. The external alignment tab 255 is circumferentially spaced apart from the external grip tab 245 (e.g., by 180-degrees).

An internal ridge 260 extends around the side wall 220. The internal ridge 260 includes axially opposing ridge faces 265a and 265b extending radially inwardly from the side wall 220. The ridge face 265a is perpendicular to the central axis 210 and is positioned nearer to the end portion 215a of the bottom member 115 than the ridge face 265b. The ridge face 265b is tapered (e.g., frustoconical) and is positioned farther from the end portion 215a of the bottom member 115 than the ridge face 265a. In some embodiments, the ridge faces 265a and 265b adjoin each other. Alternatively, the ridge faces 265a and 265b may each adjoin an intermediate surface (not shown) of the internal ridge 260.

The internal ridge 260 is circumferentially divided into ridge segments 270a-c. The ridge segment 270a is circumferentially aligned with the external grip tab 245. The ridge segment 270a has a circumferential dimension A2. The circumferential dimension A2 of the ridge segment 270a is smaller than the circumferential dimension A1 of the gap 195 (shown in FIG. 2C) by which the circumferentially opposing end portions 190a and 190b of the external ridge 180 are spaced apart from each other. The ridge segment 270b is circumferentially spaced apart from the ridge segment 270a by a gap 275a having a dimension A3, the ridge segment 270c is circumferentially spaced apart from the ridge segment 270b by a gap 275b having a dimension A4, and the ridge segment 270a is circumferentially spaced apart from the ridge segment 270c by a gap 275c having a dimension A5. In some embodiments, the dimensions A3 and A5, respectively, are equal. In some embodiments, the dimension A4 is smaller than the dimensions A3 and A5, respectively.

The end portion 215a of the bottom member 115 includes the side wall 230. In some embodiments, the side wall 230 is cylindrical. The side wall 230 defines an outer diameter D3 and axially opposing end portions 280a and 280b. The outer diameter D3 of the side wall 230 is smaller than the inner diameter D2 of the side wall 220. The end wall 225 extends radially between, and is connected to, the side walls 220 and 230. The bottom wall 235 is connected to the side wall 230 at the end portion 280b of the side wall 230 so that the side wall 230 and the bottom wall 235, in combination, define an internal region 285. In some embodiments, the bottom wall 235 is positioned nearer to the end portion 215b of the bottom member 115 than the end wall 225 (i.e., the bottom wall 235 is axially offset from the end wall 225). As a result, the side wall 220, the end wall 225, the side wall 230, and the bottom wall 235, in combination, define an internal region 290 and an internal annular groove 295 adjoining the internal region 290.

An external ridge 300 extends around the side wall 230. The external ridge 300 includes features that are substantially identical to corresponding features of the external ridge 180, which substantially identical features are given the same reference numerals. The ridge face 185b of the external ridge 300 is positioned nearer to the end portion 215b of the bottom member 115 than the ridge face 185a. The ridge face 185a of the external ridge 300 is positioned farther from the end portion 215b of the bottom member 115 than the ridge face 185b.

The bottom member 115 includes protrusions such as, for example, teeth 305a-u positioned within the internal region 285. In some embodiments, the teeth 305a-u are arranged in rows 310a-c (e.g., concentric rows). For example, the teeth 305a-c may be arranged in the row 310a, which is radially spaced apart from the central axis 210 by a dimension R1, the teeth 305d-l may be arranged in the row 310b, which is radially spaced apart from the central axis 210 by a dimension R2, and/or the teeth 305m-u may be arranged in the row 310c, which is radially spaced apart from the central axis 210 by a dimension R3. The dimension R3 is greater than the dimension R2, which, in turn, is greater than the dimension R1. The teeth 305a-u in the rows 310a-c are connected to, and extend axially from, the bottom wall 235. In addition, or instead, the teeth 305m-u in the row 310c are connected to, and extend radially inwardly from, the side wall 230. In some embodiments, the teeth 305a-u each have a diamond-shaped cross section. In some embodiments, the cross-sectional area of each of the teeth 305a-u decreases from a proximal end to a distal end thereof. In some embodiments, the teeth 305a-u are distributed (e.g., evenly) around the central axis 210. For example, the teeth 305a-c arranged in the row 310a may be distributed (e.g., evenly) around the central axis 210, the teeth 305d-l in the row 310b may be distributed (e.g., evenly) around the central axis 210, and/or the teeth 305m-u in the row 310c may be distributed (e.g., evenly) around the central axis 210.

Referring to FIGS. 4A-4H, in an embodiment, the top member 120 of the container lid 110 extends along a central axis 315 and includes a side wall 320 and a top wall 325. In some embodiments, the side wall 320 is cylindrical. The side wall 320 defines an inner diameter D4 and axially opposing end portions 330a and 330b. The inner diameter D4 of the side wall 320 is greater than the outer diameter D3 of the side wall 230. An external grip tab 335 extends radially outwardly from the side wall 320. The external grip tab 335 includes features that are substantially identical to corresponding features of the external grip tab 245, which substantially identical features are given the same reference numerals. An internal ridge 340 extends around the side wall 320. The internal ridge 340 includes features that are substantially identical to corresponding features of the internal ridge 260, which substantially identical features are given the same reference numerals. The ridge segment 270a of the internal ridge 340 is circumferentially aligned with the external grip tab 335. The top wall 325 is connected to the side wall 320 at the end portion 330a of the side wall 320. As a result, the side wall 320 and the top wall 325, in combination, define an internal region 345.

The top member 120 includes protrusions such as, for example, teeth 350a-p positioned within the internal region 345. In some embodiments, the tooth 350a is arranged along the central axis 315 and the teeth 350b-p are arranged in rows 355a and 355b (e.g., concentric rows). For example, the teeth 350b-g may be arranged in the row 355a, which is radially spaced apart from the central axis 315 by a dimension R4, and the teeth 350h-p may be arranged in the row 355b, which is radially spaced apart from the central axis 315 by a dimension R5. The dimension R5 is greater than the dimension R4. The teeth 350a-p in the rows 355a and 355b are connected to, and extend axially from, the top wall 325. In some embodiments, the teeth 350a-p each have a diamond-shaped cross section. In some embodiments, the cross-sectional area of each of the teeth 350a-p decreases from a proximal end to a distal end thereof. In some embodiments, the teeth 350b-p are distributed (e.g., evenly) around the central axis 315. For example, the teeth 350b-g in the row 355a may be distributed (e.g., evenly) around the central axis 315 and/or the teeth 350h-p in the row 355b may be distributed (e.g., evenly) around the central axis 315.

Figures 1, 5A:
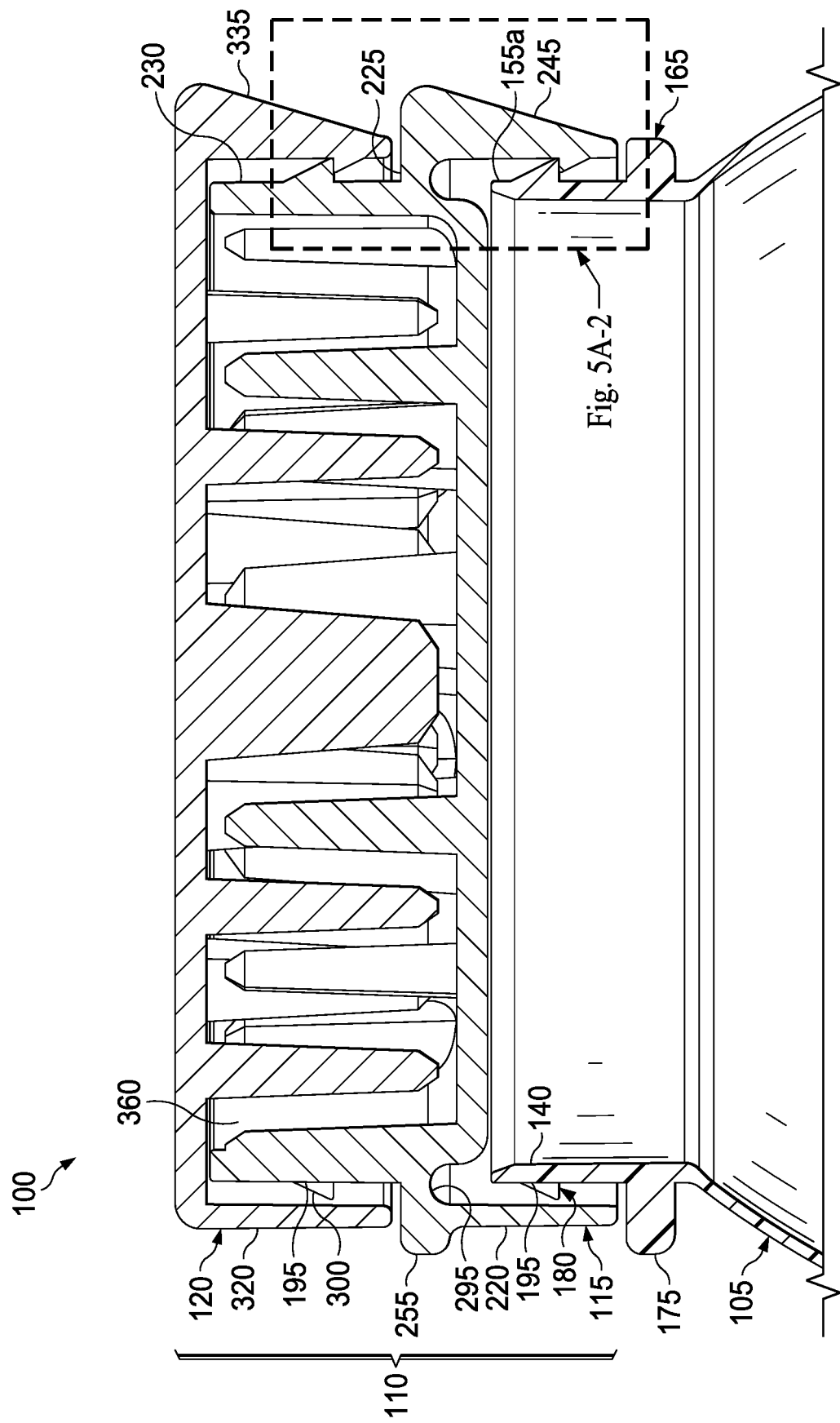
FIG. 5A-1 is a cross-sectional view of a portion of the container apparatus of FIGS. 1A and 1B in the first operational state or configuration taken along the line 5A-5A in FIG. 1A, according to one or more embodiments of the present disclosure.

The internal region 345 of the top member 120 of the container lid 110 and the internal region 285 of the bottom member 115 of the container lid 110, in combination, are also referred to herein as an internal cavity 360 when the top member 120 of the container lid 110 is attached to the bottom member 115 of the container lid 110 (see FIG. 5A-1). Moreover, when the container lid 110 is connected to the container body 105, the bottom wall 235 prevents, or at least reduces, communication of solid materials from the internal cavity 130 of the container body 105 to the internal cavity 360 of the container lid 110 and may therefore be referred to herein as a "barrier wall". Although shown as being devoid of any through openings, the bottom wall 235 (or the "barrier wall") may instead include one or more openings formed therethrough between the internal regions 285 and 290 of the bottom member 115.

Figures 2, 5C:
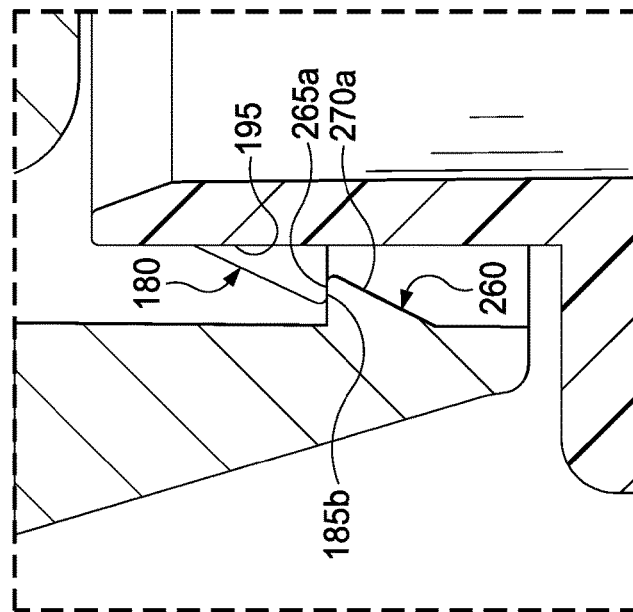
Figures 2, 5A:
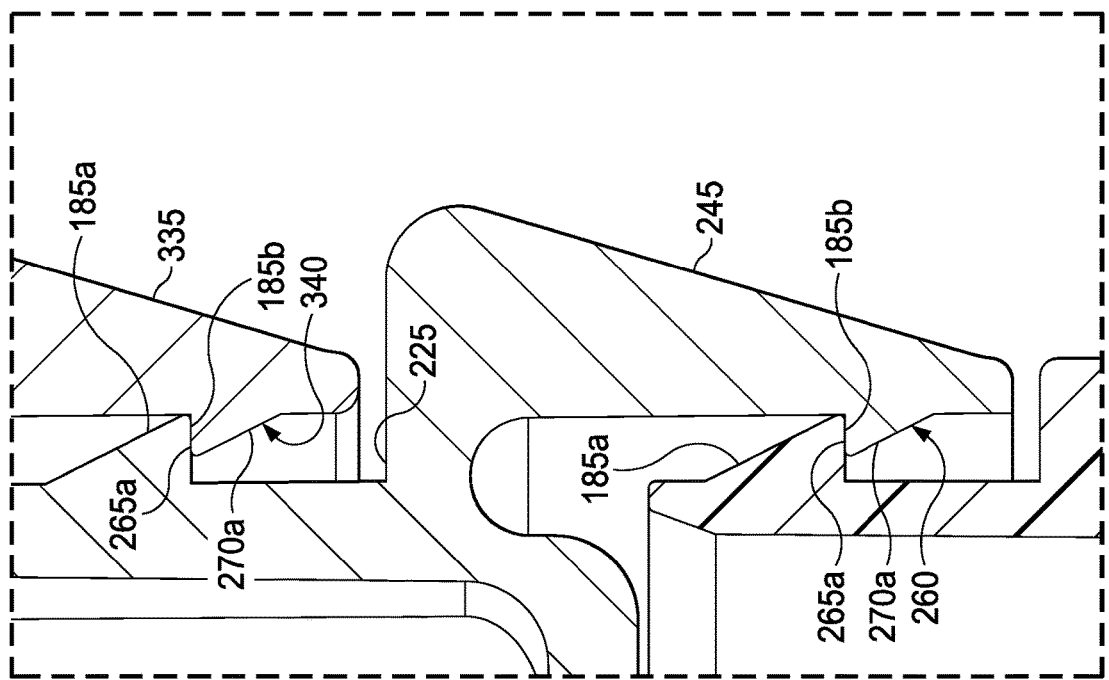

Referring to FIGS. 5A-1 and 5A-2, the container apparatus 100 of FIGS. 1A-4H is illustrated in a first operational state or configuration, according to one or more embodiments of the present disclosure. In the first operational state or configuration, the bottom member 115 of the container lid 110 is attached to the container body 105 in a locked position and the top member 120 of the container lid 110 is attached to the bottom member 115 of the container lid 110 in a locked position. In some embodiments, when the container apparatus 100 is in the first operational state or configuration, the external alignment tab 255 of the bottom member 115 of the container lid 110 is circumferentially aligned with the external alignment tab 175 of the container body 105 and the external grip tab 335 of the top member 120 of the container lid 110 is circumferentially aligned with the external grip tab 245 of the bottom member 115 of the container lid 110, as shown in FIGS. 1A, 5A-1 and 5A-2. In some embodiments, when the bottom member 115 of the container lid 110 is attached to the container body 105, the end portion 155a of the neck 140 of the container body 105 extends within the internal annular groove 295 formed in the bottom member 115.

When the bottom member 115 of the container lid 110 is attached to the container body 105 in the locked position, as shown in FIGS. 5A-1 and 5A-2, the ridge segments 270a-c of the internal ridge 260 of the bottom member 115 extend between the external collar 165 and the external ridge 180 of the container body 105 (the ridge segments 270b and 270c are not visible in FIGS. 5A-1 and 5A-2). More particularly, the bottom member 115 is attached to the container body 105 via engagement between the ridge face 265a of the internal ridge 260 and the ridge face 185b of the external ridge 180. The locked position of the bottom member 115 in relation to the container body 105 is characterized in that the ridge segment 270a of the internal ridge 260 is not aligned with the gap 195 between the circumferentially opposing end portions 190a and 190b of the external ridge 180, but is instead aligned with the external ridge 180 itself. As a result, in addition to the ridge segments 270b and 270c engaging the ridge face 185b of the external ridge 180, in the locked position, the ridge segment 270a engages the ridge face 185b of the external ridge 180.

In some embodiments, the bottom member 115 of the container lid 110 may be attached to the container body 105 by forcing the ridge segments 270a-c of the internal ridge 260 of the bottom member 115 axially against the ridge face 185a of external ridge 180 of the container body 105 to cause the neck 140 of the container body 105 and/or the side wall 220 of the bottom member 115 to deform allowing the ridge segments 270a-c of the bottom member 115 to "ramp over" the external ridge 180 of the container body 105 towards the external collar 165.

When the top member 120 of the container lid 110 is attached to the bottom member 115 of the container lid 110 in the locked position, as shown in FIGS. 5A-1 and 5A-2, the ridge segments 270a-c of the internal ridge 340 of the top member 120 extend between the end wall 225 and the external ridge 300 of the bottom member 115 (the ridge segments 270b and 270c are not visible in FIGS. 5A-1 and 5A-2). More particularly, the top member 120 is attached to the bottom member 115 via engagement between the ridge face 265a of the internal ridge 340 and the ridge face 185b of the external ridge 300. The locked position of the top member 120 in relation to the bottom member 115 is characterized in that the ridge segment 270a of the internal ridge 340 is not aligned with the gap 195 between the circumferentially opposing end portions 190a and 190b of the external ridge 300, but is instead aligned with the external ridge 300 itself. As a result, in addition to the ridge segments 270b and 270c engaging the ridge face 185b of the external ridge 300, in the locked position, the ridge segment 270a engages the ridge face 185b of the external ridge 300.

In some embodiments, the top member 120 of the container lid 110 may be attached to the bottom member 115 of the container lid 110 by forcing the ridge segments 270a-c of the internal ridge 340 of the top member 120 axially against the ridge face 185a of external ridge 300 of the bottom member 115 to cause the side wall 230 of the bottom member 115 and/or the side wall 320 of the top member 120 to deform allowing the ridge segments 270a-c of the top member 120 to "ramp over" the external ridge 300 of the bottom member 115 towards the end wall 225.

Figure 5B:
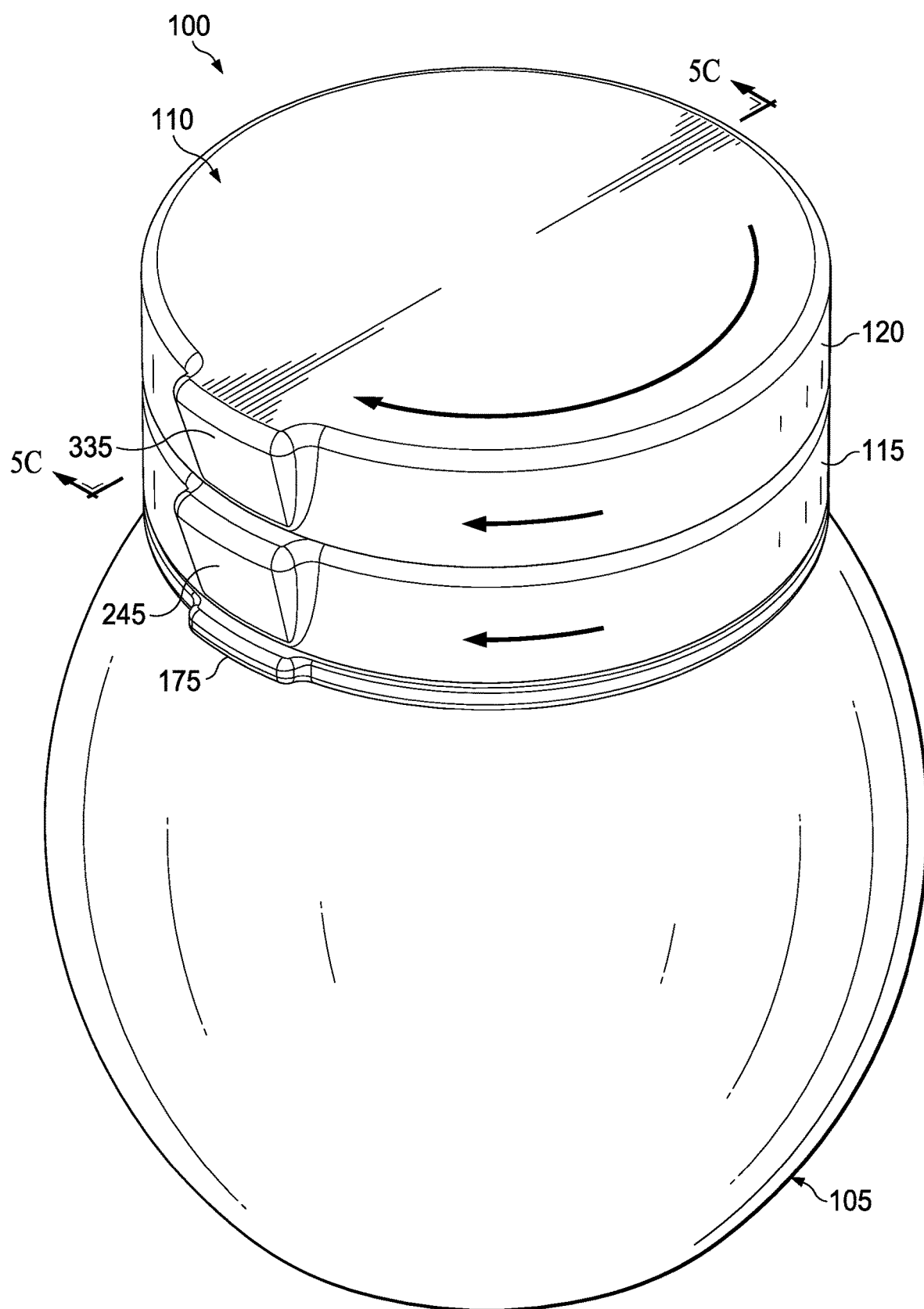
FIG. 5B is a top-front-right perspective view of the container apparatus of FIGS. 1A and 1B in a second operational state or configuration, according to one or more embodiments of the present disclosure.
Figures 1, 5C:
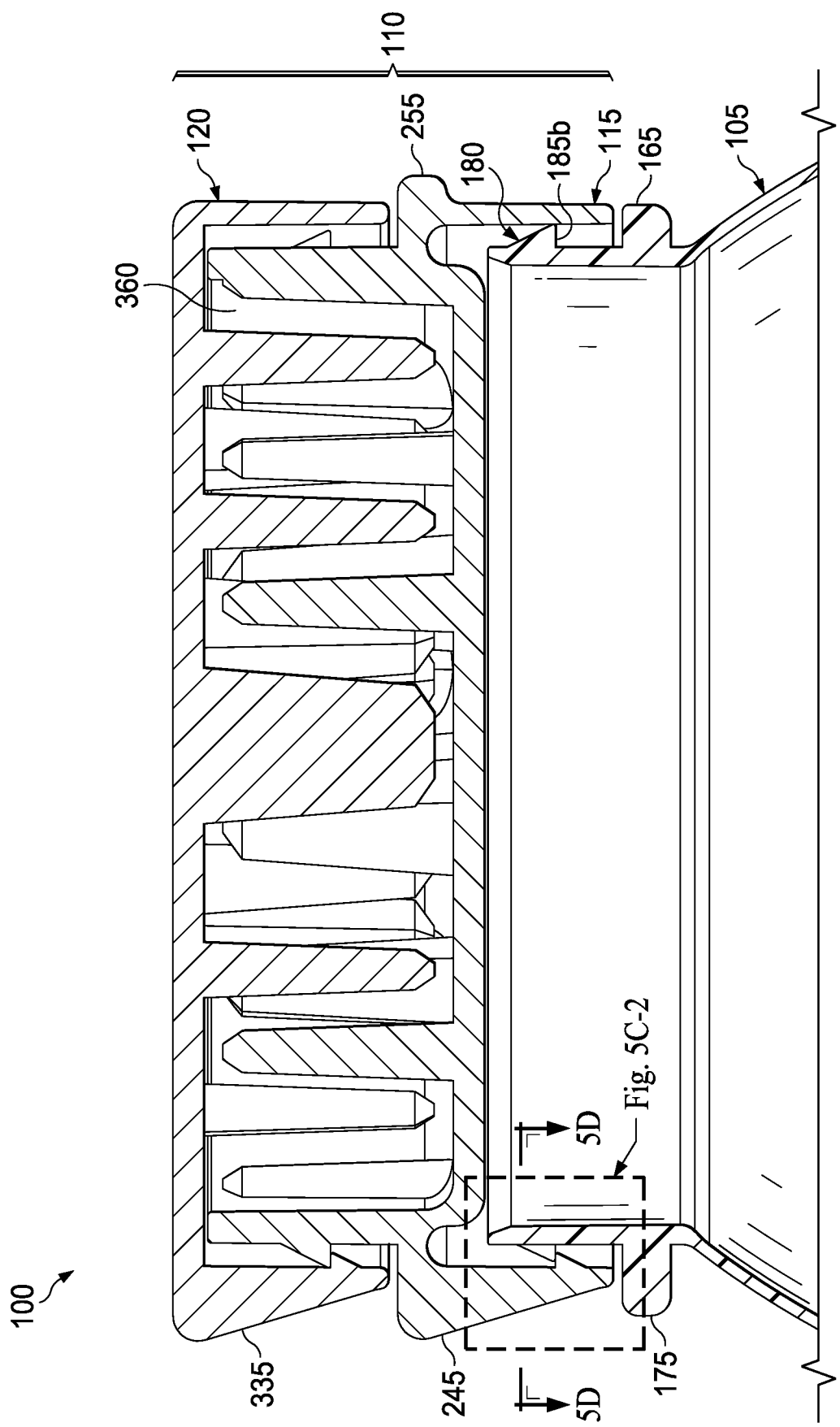
Figure 5D:
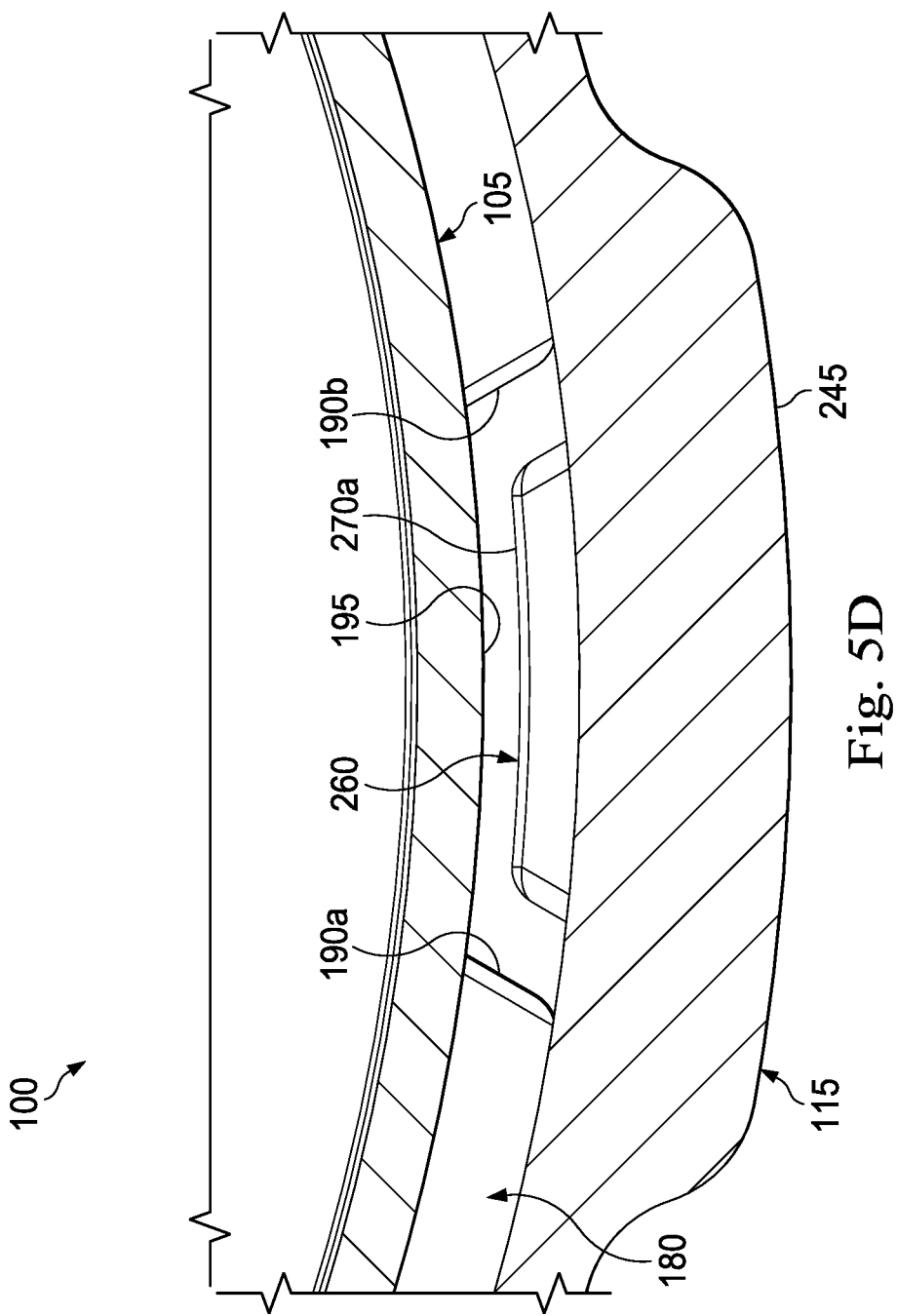
FIG. 5D is a cross-sectional view of a portion of the container apparatus of FIG. 5B in the second operational state or configuration taken along the line 5D-5D in FIG. 5C-1, according to one or more embodiments of the present disclosure.

Referring to FIGS. 5B-5D, the container apparatus 100 of FIGS. 1A-4H is illustrated in a second operational state or configuration, according to one or more embodiments of the present disclosure. To achieve the second operational state or configuration when starting from the first operational state or configuration, the container lid 110 (including both the bottom member 115 and the top member 120) is rotated relative to the container body 105 as indicated by arrows in FIG. 5B. In some embodiments, when the container apparatus 100 is in the second operational state or configuration, the external grip tab 335 of the top member 120 of the container lid 110 is circumferentially aligned with the external grip tab 245 of the bottom member 115 of the container lid 110 and the external alignment tab 175 of the container body 105, as shown in FIGS. 5A-1, 5A-2, and 5B. In addition, the external alignment tab 255 of the bottom member 115 of the container lid 110 is circumferentially offset (e.g., 180-degrees) from the external alignment tab 175 of the container body 105. As shown in FIGS. 5B, 5C-1 and 5C-2, upon obtaining the second operational state or configuration, the bottom member 115 of the container lid 110 is attached to the container body 105 in an unlocked position and the top member 120 of the container lid 110 is attached to the bottom member 115 of the container lid 110 in the locked position.

When the bottom member 115 of the container lid 110 is attached to the container body 105 in the unlocked position, as shown in FIGS. 5C-1 and 5C-2, the ridge segments 270b and 270c of the internal ridge 260 of the bottom member 115 extend between the external collar 165 and the external ridge 180 of the container body 105 (the ridge segments 270b and 270c are not visible in FIGS. 5C-1 and 5C-2). More particularly, the bottom member 115 is attached to the container body 105 via engagement between the ridge segments 270b and 270c of the internal ridge 260 and the ridge face 185b of the external ridge 180. The unlocked position of the bottom member 115 in relation to the container body 105 is characterized in that the ridge segment 270a of the internal ridge 260 is aligned with the gap 195 between the circumferentially opposing end portions 190a and 190b of the external ridge 180, as shown most clearly in FIGS. 5C-1, 5C-2, and 5D. Because of such alignment, an upward force can be applied against the external grip tab 245 when the container lid 110 is attached to the container body 105 in the unlocked position to move the ridge segment 270a upwardly through the gap 195 between the circumferentially opposing end portions 190a and 190b of the external ridge 180 and to detach the bottom member 115 from the container body 105.

Figure 5E:
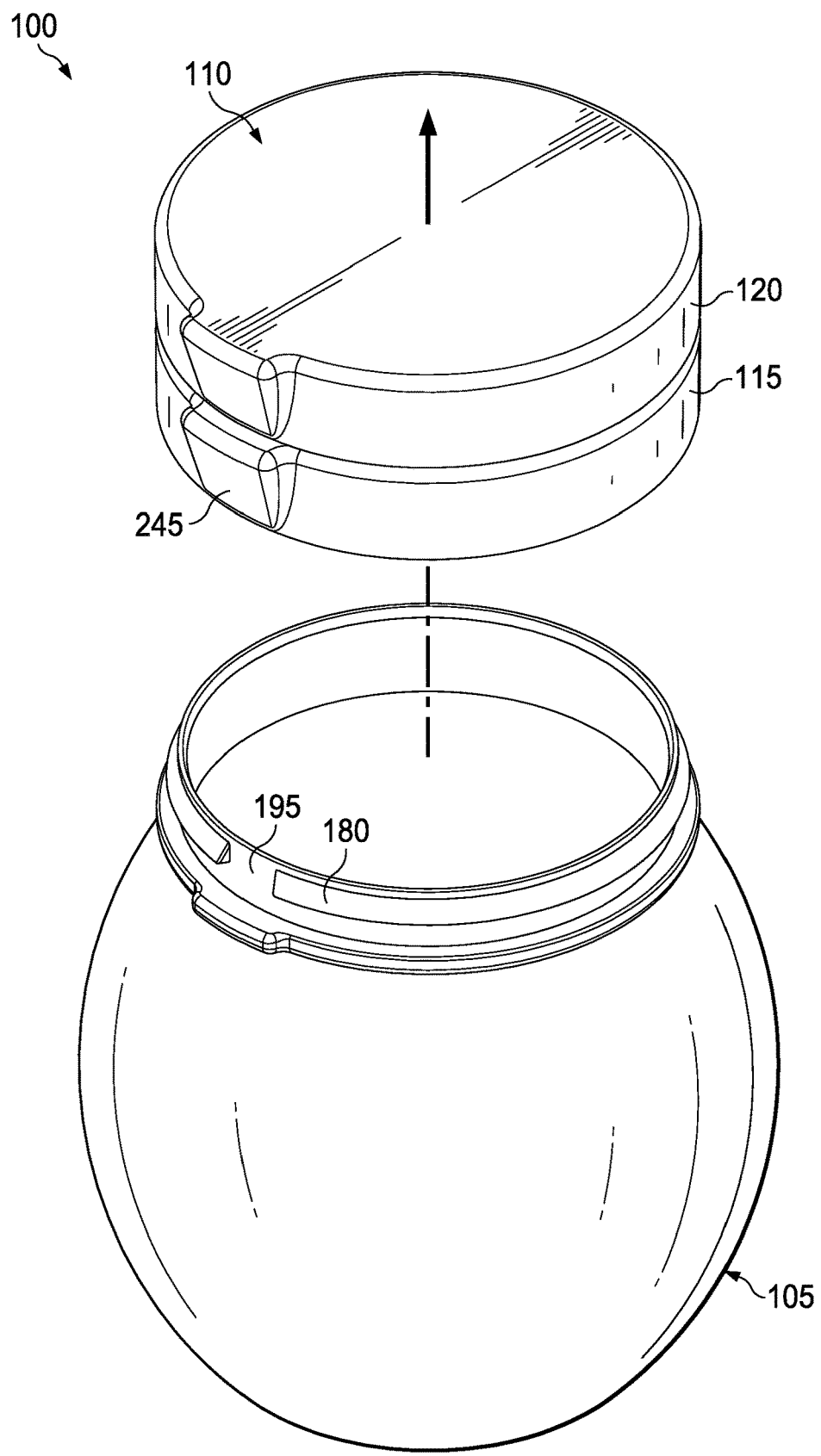
FIG. 5E is a top-front-right perspective view of the container apparatus of FIGS. 1A and 1B in a third operational state or configuration, according to one or more embodiments of the present disclosure.

Referring to FIG. 5E, the container apparatus 100 of FIGS. 1A-4H is illustrated in a third operational state or configuration, according to one or more embodiments of the present disclosure. To achieve the third operational state or configuration when starting from the second operational state or configuration, the container lid 110 is translated relative to the container body 105, or vice versa, as indicated by the arrow in FIG. 5E. The relative translation between the container lid 110 and the container body 105 can be initiated by applying an upward force against the external grip tab 245 when the container lid 110 is attached to the container body 105 in the unlocked position to move the ridge segment 270a (not visible in FIG. 5E) upwardly through the gap 195 between the circumferentially opposing end portions 190a and 190b of the external ridge 180. Upon obtaining the third operational state or configuration, the bottom member 115 of the container lid 110 is detached from the container body 105 and the top member 120 of the container lid 110 is attached to the bottom member 115 of the container lid 110 in the locked position.

Figure 5F:
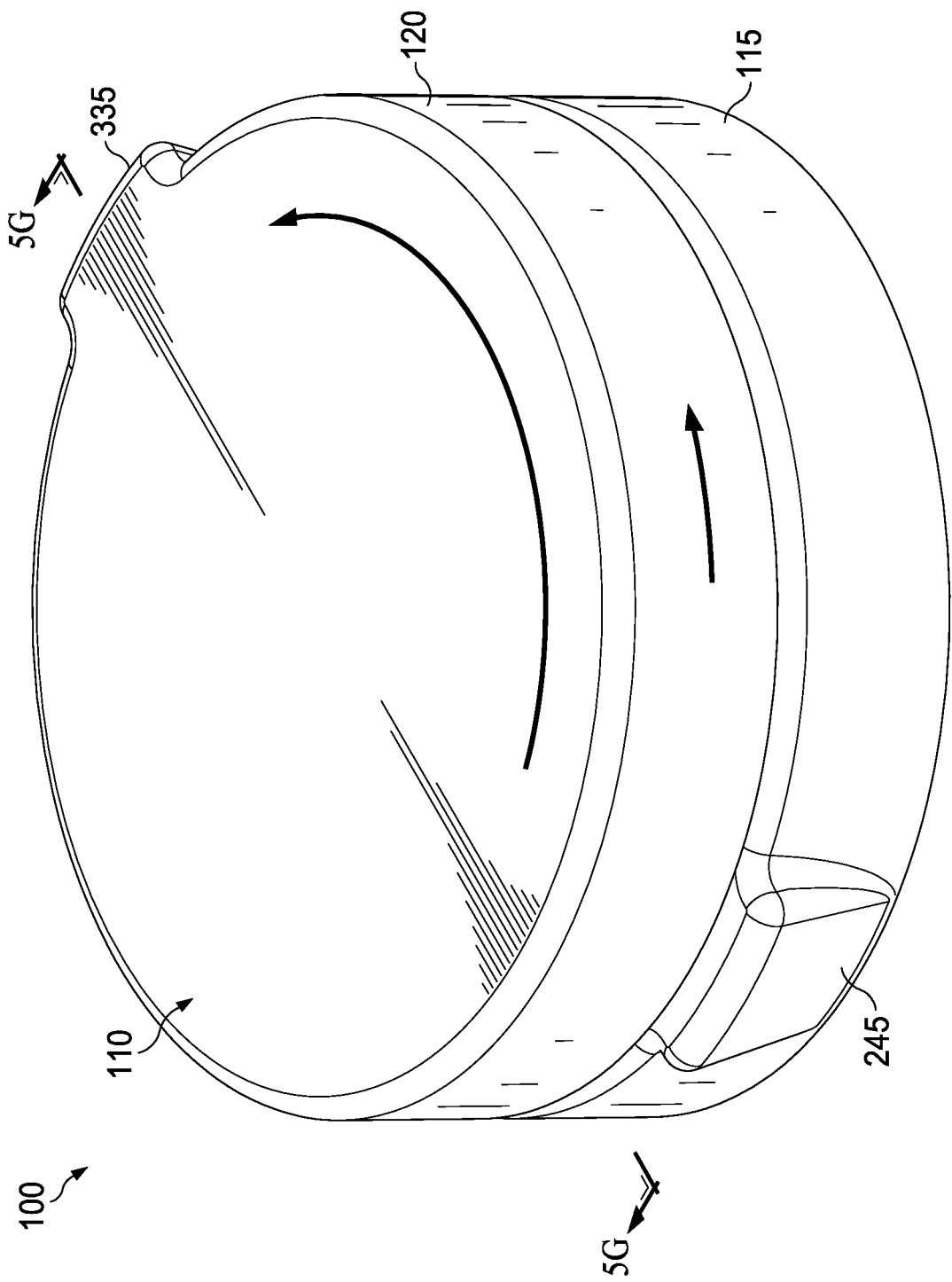
FIG. 5F is a top-front-right perspective view of the container apparatus of FIGS. 1A and 1B in a fourth operational state or configuration, according to one or more embodiments of the present disclosure.
Figure 5H:
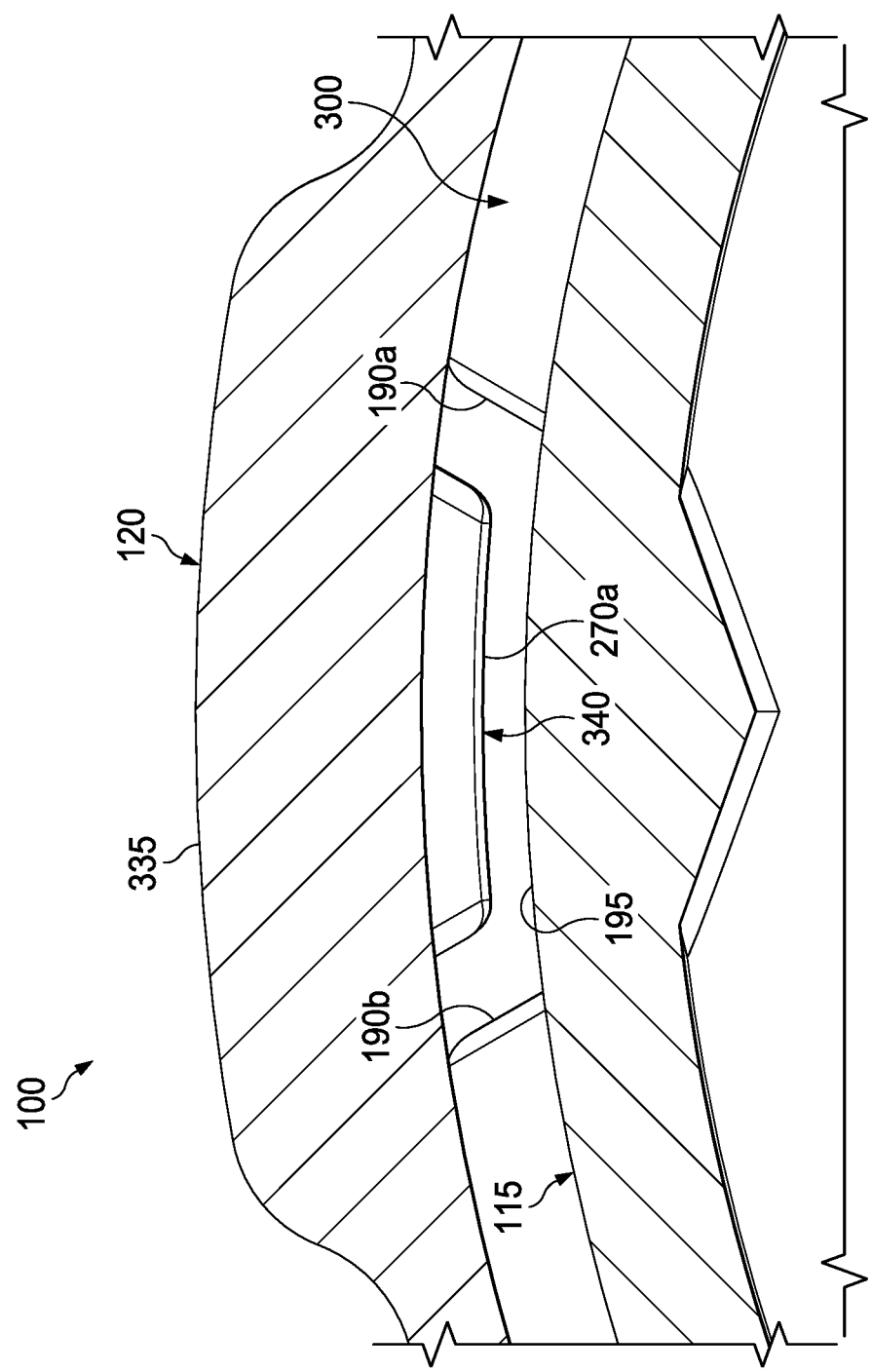
FIG. 5H is a cross-sectional view of a portion of the container apparatus of FIG. 5F in the fourth operational state or configuration taken along the line 5H-5H in FIG. 5G-1, according to one or more embodiments of the present disclosure.

Referring to FIGS. 5F-5H, the container apparatus 100 of FIGS. 1A-4H is illustrated in a fourth operational state or configuration, according to one or more embodiments of the present disclosure. To achieve the fourth operational state or configuration when starting from the third operational state or configuration, the top member 120 of the container lid 110 is rotated relative to the bottom member 115 of the container lid 110 as indicated by arrows in FIG. 5F. In some embodiments, when the container apparatus 100 is in the fourth operational state or configuration, the external grip tab 335 of the top member 120 of the container lid 110 is circumferentially offset (e.g., 180-degrees) from the external grip tab 245 of the bottom member 115 of the container lid 110, as shown in FIGS. 5F, 5G-1, and 5G-2. As shown in FIGS. 5G-1, 5G-2, and 5H, upon obtaining the fourth operational state or configuration, the bottom member 115 of the container lid 110 is detached from the container body 105 and the top member 120 of the container lid 110 is attached to the bottom member 115 of the container lid 110 in an unlocked position.

When the top member 120 of the container lid 110 is attached to the bottom member 115 of the container lid 110 in the unlocked position, as shown in FIGS. 5G-1 and 5G-2, the ridge segments 270b and 270c of the internal ridge 340 of the top member 120 extend between the end wall 225 and the external ridge 300 of the bottom member 115 (the ridge segments 270b and 270c are not visible in FIGS. 5G-1 and 5G-2). More particularly, the top member 120 is attached to the bottom member 115 via engagement between the ridge segments 270b and 270c of the internal ridge 340 and the ridge face 185b of the external ridge 300. The unlocked position of the top member 120 in relation to the bottom member 115 is characterized in that the ridge segment 270a of the internal ridge 340 is aligned with the gap 195 between the circumferentially opposing end portions 190a and 190b of the external ridge 300, as shown most clearly in FIGS. 5G-1, 5G-2, and 5H. Because of such alignment, an upward force can be applied against the external grip tab 335 when the top member 120 is attached to the bottom member 115 in the unlocked position to move the ridge segment 270a upwardly through the gap 195 between the circumferentially opposing end portions 190a and 190b of the external ridge 300 and to detach the top member 120 from the bottom member 115.

Referring again to FIGS. 3C and 4D, in some embodiments, the dimension R3 is greater than the dimension R5, the dimension R5 is greater than the dimension R2, the dimension R2 is greater than the dimension R4, and the dimension R4 is greater than the dimension R1. As a result, when top member 120 of the container lid 110 is attached to the bottom member 115 of the container lid 110, that is, when the container apparatus 100 is placed in the first operational state or configuration shown in FIGS. 1A, 5A-1, and 5A-2, the second operational state or configuration shown in FIGS. 5B-5D, the third operational state or configuration shown in FIG. 5E, or the fourth operational state or configuration shown in FIG. 5F-5H: the row 355b including the teeth 350h-p is positioned radially between the row 310b including the teeth 305d-l and the row 310c including the teeth 305m-u; the row 310b including the teeth 305d-l is positioned radially between the row 355a including the teeth 350b-g and the row 355b including the teeth 350h-p; and the row 355a including the teeth 350b-g is positioned radially between the row 310a including the teeth and the row 310b including the teeth 305d-l.

Figure 5I:
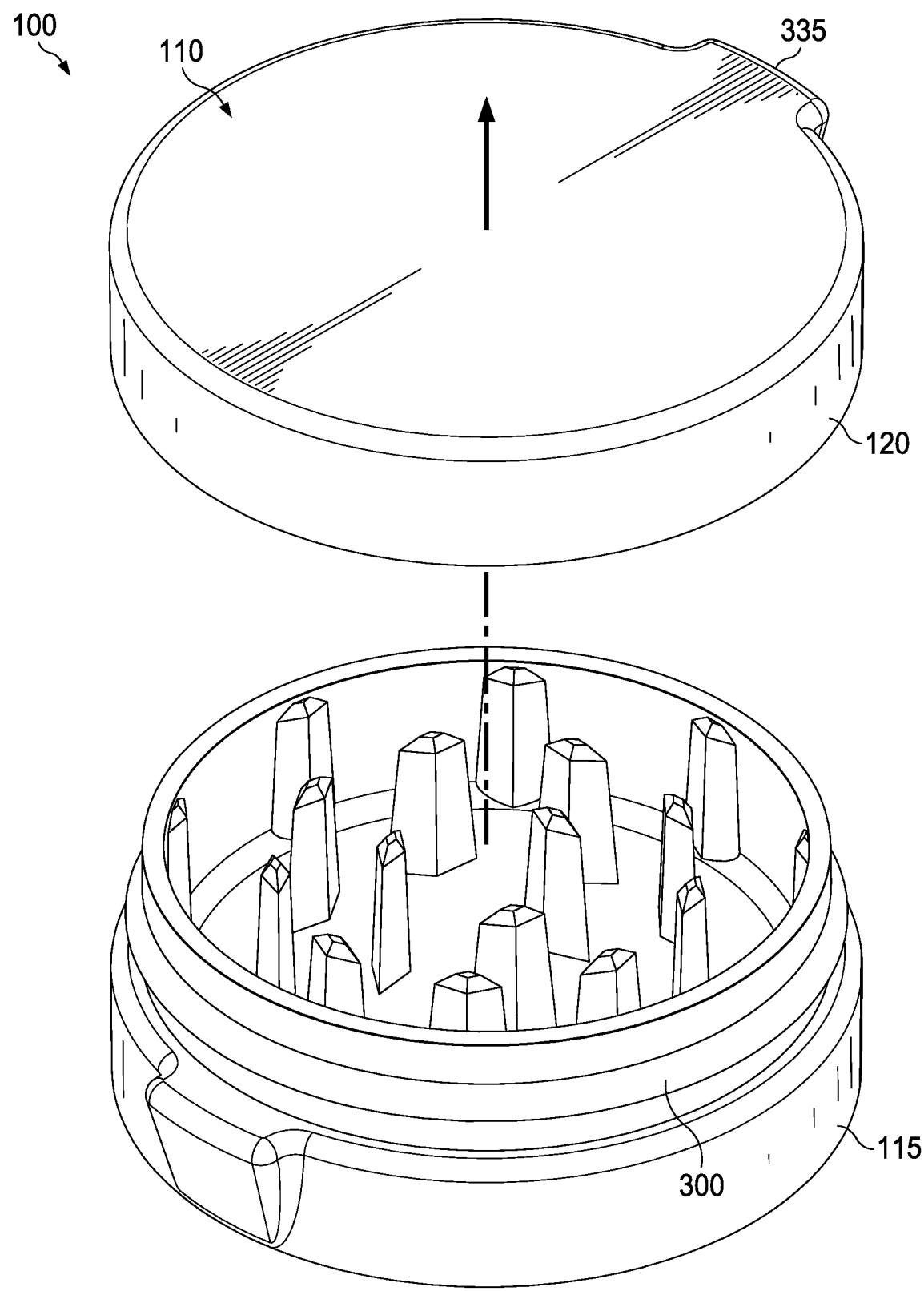
FIG. 5I is a top-front-right perspective view of the container apparatus of FIGS. 1A and 1B in a fifth operational state or configuration, according to one or more embodiments of the present disclosure.

Referring to FIG. 5I, the container apparatus 100 of FIGS. 1A-4H is illustrated in a fifth operational state or configuration, according to one or more embodiments of the present disclosure. To achieve the fifth operational state or configuration when starting from the fourth operational state or configuration, the top member 120 of the container lid 110 is translated relative to the bottom member 115 of the container lid 110, or vice versa, as indicated by the arrow in FIG. 5I. The relative translation between the top member 120 of the container lid 110 and the bottom member 115 of the container lid 110 can be initiated by applying an upward force against the external grip tab 335 when the top member 120 of the container lid 110 is attached to the bottom member 115 of the container lid 110 in the unlocked position to move the ridge segment 270a (not visible in FIG. 5I) upwardly through the gap 195 (not visible in FIG. 5I) between the circumferentially opposing end portions 190a and 190b of the external ridge 300. Upon obtaining the fifth operational state or configuration, the bottom member 115 of the container lid 110 is detached from the container body 105 and the top member 120 of the container lid 110 is detached from the bottom member 115 of the container lid 110.

In some embodiments, the container apparatus 100 is also actuable to: a sixth operational state or configuration in which the top member 120 of the container lid 110 is detached from the bottom member 115 of the container lid 110 and the bottom member 115 of the container lid 110 is attached to the container body 105 in the locked position; and a seventh operational state or configuration in which the top member 120 of the container lid 110 is detached from the bottom member 115 of the container lid 110 and the bottom member 115 of the container lid 110 is attached to the container body 105 in the unlocked position.

In operation, unground solid materials are stored in the internal cavity 130 of the container body 105. For example, the unground solid materials may be or include food, herbs, spices, other cooking ingredients, tea leaves, other organic or inorganic materials, the like, or a combination thereof. The container lid 110 is operable to retain the unground solid materials within the internal cavity 130 of the container body 105 when the container lid 110 is attached to the container body 105, that is, when the container apparatus 100 is in the first operational state or configuration shown in FIGS. 1A, 5A-1, and 5A-2, the second operational state or configuration shown in FIGS. 5B-5D, the sixth operational state or configuration described above, or the seventh operational state or configuration described above. The unground solid materials are removable from the internal cavity 130 via the mouth 160 in the neck 140 of the container body 105 when the container lid 110 is detached from the container body 105, that is, when the container apparatus 100 is in the third operational state or configuration shown in FIG. 5E, the fourth operational state or configuration shown in FIGS. 5F-5H, or the fifth operational state or configuration shown in FIG. 5I.

Figure 5J:
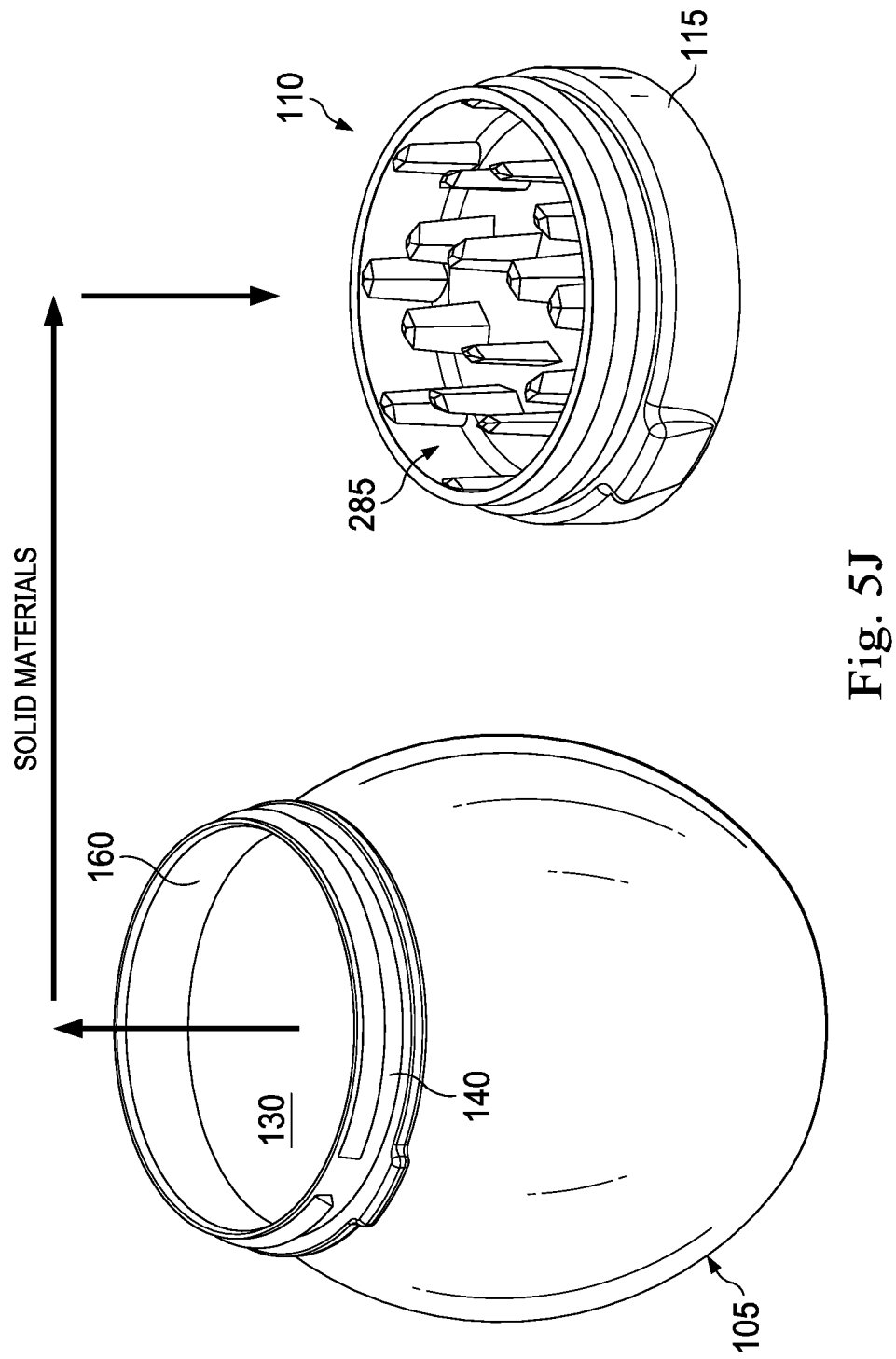
FIG. 5J is another top-front-right perspective view of the container apparatus of FIGS. 1A and 1B in the fifth operational state or configuration and in the process of being loaded with solid materials, according to one or more embodiments of the present disclosure.
Figure 5K:
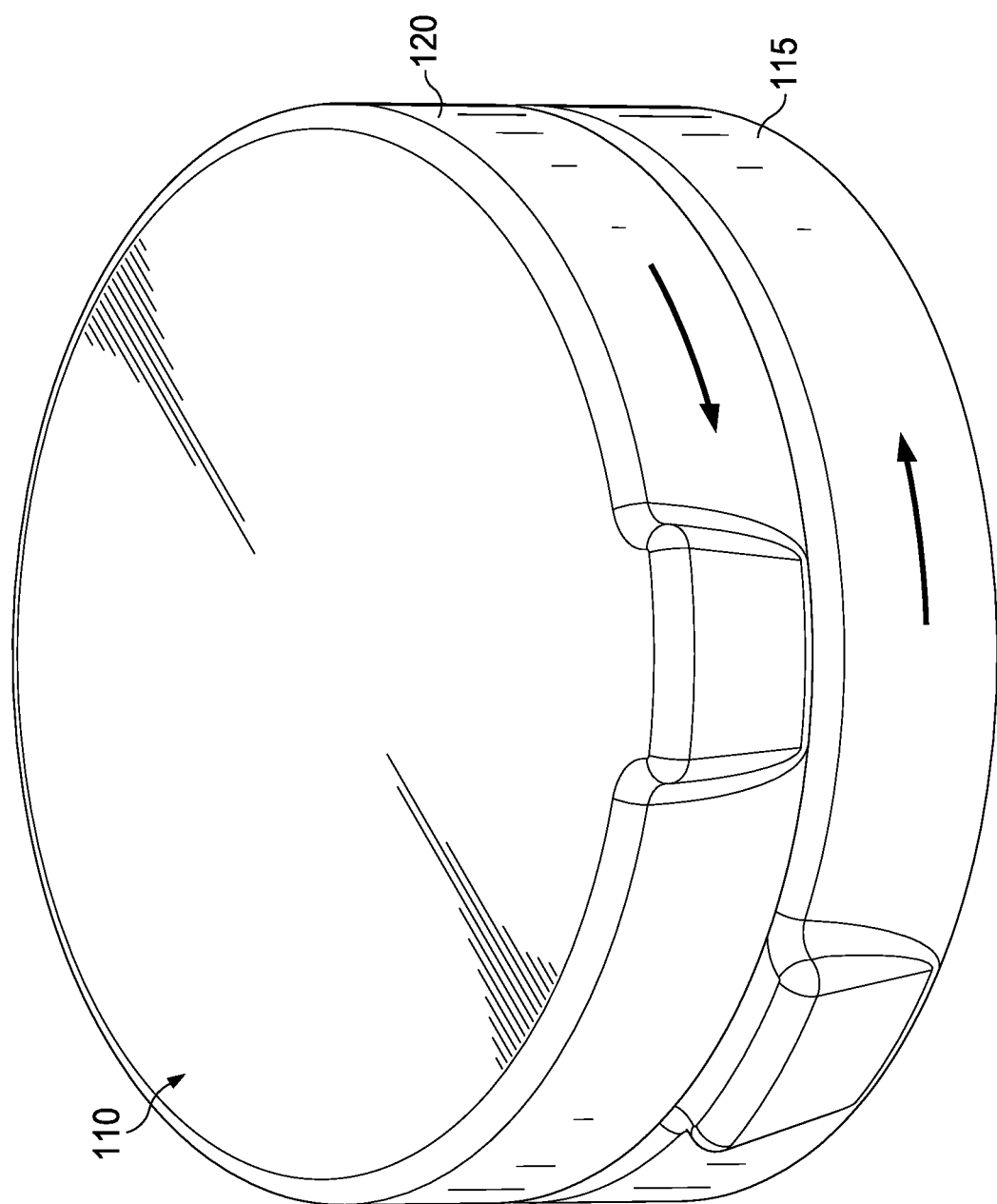
FIG. 5K is a top-front-right perspective view of the container apparatus of FIGS. 1A and 1B in the third operational state or configuration and in the process of grinding the solid materials, according to one or more embodiments of the present disclosure.

Referring to FIGS. 5J and 5K, with continuing reference to FIGS. 1A and 5A-5I, in an embodiment, the container lid 110 is operable to grind the unground solid materials. To grind the unground solid materials, the container apparatus 100 is first placed in the fifth operational state or configuration shown in FIG. 5I and the unground solid materials are removed from the internal cavity 130 of the container body 105 and placed into the internal region 285 of the bottom member 115 of the container lid 110 (or the internal region 345 of the top member 120 of the container lid 110), as indicated by the arrows in FIG. 5J. The top member 120 of the container lid 110 is then attached to the bottom member 115 of the container lid 110, as shown in FIG. 5K, that is, the container apparatus 100 is placed in the first operational state or configuration shown in FIGS. 1A, 5A-1, and 5A-2, the second operational state or configuration shown in FIGS. 5B-5D, the third operational state or configuration shown in FIG. 5E, or the fourth operational state or configuration shown in FIG. 5F-5H. As a result, the solid materials are trapped between the top member 120 and the bottom member 115, that is, within the internal cavity 360 defined by the internal region 285 of the bottom member 115 and the internal region 345 of the top member 120, in combination.

The top member 120 of the container lid 110 and the bottom member 115 of the container lid 110 are then rotated (e.g., back and forth) relative to one another, as indicated by the arrows in FIG. 5K, to grind or break apart the solid materials into smaller particles. More particularly, the rotation of the teeth 305$m$-$u$ in the bottom member 115 of the container lid 110 relative to the teeth 350$a$-$p$ in the top member 120 of the container lid 110, or vice versa, causes the teeth 305$a$-$u$ and 350$a$-$p$ to break apart the solid materials into smaller particles. Once the solid materials are suitably ground, the top member 120 of the container lid 110 is detached from the bottom member 115 of the container lid 110, that is, the container apparatus 100 is placed in the fifth operational state or configuration shown in FIG. 5I, the sixth operational state or configuration described above, or the seventh operational state or configuration described above. Subsequently, the ground solid materials are removed from the container lid 110.

The operation of the container apparatus 100 enables a user to maintain solid materials such as, for example, food, herbs, spices, other cooking ingredients, tea leaves, other organic or inorganic materials, the like, or a combination thereof, in an unground or whole state until just before the solid materials are needed to be utilized in a ground or broken apart state. In some embodiments, the operation of the container apparatus 100 enables a user to grind the solid materials with the container lid 110 when the container lid 110 is detached from the container body 105, or when the container lid 110 is attached to the container body 105. In some embodiments, during operation of the container apparatus 100, the bottom wall 235 (or the "barrier wall") of the bottom member 115 of the container lid 110 provides a barrier between the internal region 285 of the bottom member 115 in which the teeth 305$a$-$u$ extend and the internal cavity 130 of the container body 105 when the bottom member 115 is attached to the container body 105. As mentioned above, in some embodiments, the bottom wall 235 is devoid of any through openings. As a result, the solid materials in the internal cavity 130 of the container body 105 are not communicable to the internal region 285 of the bottom member 115 when the container apparatus 100 is in the first operational state or configuration shown in FIGS. 1A, 5A-1, and 5A-2, the second operational state or configuration shown in FIGS. 5B-5D, the sixth operational state or configuration described above, or the seventh operational state or configuration described above.

However, in other embodiments, the bottom wall 235 may include one or more through openings extending between the internal regions 285 and 290 of the bottom member 115. As a result, the solid materials in the internal cavity 130 of the container body 105 are communicable to the internal region 285 of the bottom member 115 when the container apparatus 100 is in the first operational state or configuration shown in FIGS. 1A, 5A-1, and 5A-2, the second operational state or configuration shown in FIGS. 5B-5D, the sixth operational state or configuration described above, or the seventh operational state or configuration described above. This enables a user to communicate solid materials from the internal cavity 130 of the container body 105 into the internal cavity 360 (i.e., the internal regions 285 and 345, in combination) of the container lid 110 just prior to grinding or breaking apart the solid materials with the teeth 305$a$-$u$ and 350$a$-$p$. The top member 120 can then be detached from the bottom member 115 as described herein to dispense the ground solid materials from the container lid 110.

In some embodiments, the bottom member 115 is omitted from the container lid 110 and the container apparatus 100 is actuable to: an eighth operational state or configuration in which the top member 120 of the container lid 110 is attached to the container body 105 in a locked position; and a ninth operational state or configuration in which the top member 120 of the container lid 110 is attached to the container body 105 in an unlocked position. In at least one such embodiment, the teeth 350$a$-$p$ are omitted from the top member 120 of the container lid 110. The locked position of the top member 120 in relation to the container body 105 is characterized in that: the ridge segments 270$a$-$c$ of the internal ridge 340 of the top member 120 extend between the external collar 165 and the external ridge 180 of the container body 105; and the ridge segment 270$a$ of the internal ridge 340 is not aligned with the gap 195 between the circumferentially opposing end portions 190$a$ and 190$b$ of the external ridge 180, but is instead aligned with the external ridge 180 itself. The unlocked position of the top member 120 in relation to the container body 105 is characterized in that: the ridge segments 270$a$-$c$ of the internal ridge 340 of the top member 120 extend between the external collar 165 and the external ridge 180 of the container body 105; and the ridge segment 270$a$ of the internal ridge 340 is aligned with the gap 195 between the circumferentially opposing end portions 190$a$ and 190$b$ of the external ridge 180. Because of such alignment, an upward force can be applied against the external grip tab 335 when the top member 120 of the container lid 110 is attached to the container body 105 in the unlocked position to move the ridge segment 270$a$ upwardly through the gap 195 between the circumferentially opposing end portions 190$a$ and 190$b$ of the external ridge 180 and to detach the top member 120 from the container body 105.

A container apparatus has been disclosed according to a first aspect. The container apparatus according to the first aspect generally includes a container body defining a first internal cavity and a container lid defining a second internal cavity, the container lid including a first member attached to the container body and a second member attached to the first member. The first and second members are rotationally movable relative to each other between a first locked position in which the second member is not translationally movable relative to the first member to detach the second member from the first member and a first unlocked position in which the second member is translationally movable relative to the first member to detach the second member from the first member. In one or more embodiments, the first and second members, in combination, define the second internal cavity, and the container lid further includes a plurality of protrusions extending within the second internal cavity. In one or more embodiments, the first and second members are rotationally movable relative to each other to cause the plurality of protrusions to grind solid materials located in the second internal cavity. In one or more embodiments, the plurality of protrusions includes a first protrusion connected to the first member and a second protrusion to connected to the second member. In one or more embodiments, the first member and the container body are rotationally movable relative to each other between a second locked position in which the first member is not translationally movable relative to the container body to detach the container lid from the container body and a second unlocked position in which the first member is translationally movable relative to the container body to detach the container lid from the container body. In one or more embodiments, when the container lid is detached from the container body, the first and second members are rotationally movable relative to each other to cause the plurality of protrusions to grind solid materials located in the second internal cavity. In one or more embodiments, when the container lid is detached from the container body and the second member is detached from the first member, solid materials located in the first internal cavity are communicable to the second internal cavity.

A container apparatus has also been disclosed according to a second aspect. The container apparatus according to the second aspect generally includes a container body defining a first internal cavity and a container lid attached to the container body and defining a second internal cavity, the container lid including a plurality of protrusions extending within the second internal cavity and a barrier wall. The barrier wall prevents, or at least reduces, communication of solid materials located in the first internal cavity to the second internal cavity. In one or more embodiments, the container lid further includes a first member attached to the container body and a second member attached to the first member, the first and second members, in combination, defining the second internal cavity. In one or more embodiments, the barrier wall is part of the first member attached to the container body. In one or more embodiments, the first and second members are rotationally movable relative to each other to cause the plurality of protrusions to grind solid materials located in the second internal cavity. In one or more embodiments, the plurality of protrusions includes a first protrusion connected to the first member and a second protrusion to connected to the second member. In one or more embodiments, the first member is translationally movable relative to the container body to detach the container lid from the container body. In one or more embodiments, when the container lid is detached from the container body, the first and second members are rotationally movable relative to each other to cause the plurality of protrusions to grind solid materials located in the second internal cavity. In one or more embodiments, the second member is translationally movable relative to the first member to detach the second member from the first member. In one or more embodiments, when the container lid is detached from the container body and the second member is detached from the first member, the solid materials located in the first internal cavity are communicable to the second internal cavity. In one or more embodiments, the barrier wall is devoid of any through openings.

A container lid has also been disclosed. The container lid generally includes a first member and a second member attached to the first member, the first and second members, in combination, defining an internal cavity. The first member is attachable to a container body defining another internal cavity. The first and second members are rotationally movable relative to each other between a first locked position in which the second member is not translationally movable relative to the first member to detach the second member from the first member and a first unlocked position in which the second member is translationally movable relative to the first member to detach the second member from the first member. In one or more embodiments, when the second member is detached from the first member, solid materials are communicable to and from the internal cavity. In one or more embodiments, the container lid further includes a plurality of protrusions extending within the internal cavity. In one or more embodiments, the first and second members are rotationally movable relative to each other to cause the plurality of protrusions to grind solid materials located in the internal cavity. In one or more embodiments, the plurality of protrusions includes a first protrusion connected to the first member and a second protrusion to connected to the second member.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An apparatus, comprising:
a container body defining a first internal cavity, wherein:
a first external ridge circumferentially extends partway along the container body, the first external ridge defining circumferentially opposing first and second end portions that are spaced apart from each other by a first gap having a first circumferential dimension,
a first external tab extends outwardly from the container body;
and
a container lid defining a second internal cavity, the container lid comprising:
a first member attached to the container body, wherein:
a first internal ridge circumferentially extends partway along the first member, the first internal ridge being circumferentially divided into at least first and second ridge segments that are circumferentially spaced apart, the first ridge segment having a second circumferential dimension that is smaller than the first circumferential dimension of the first gap,
a second external ridge circumferentially extends partway along the first member, the second external ridge defining circumferentially opposing third and fourth end portions that are spaced apart from each other by a second gap having a third circumferential dimension,
a second external tab extends outwardly from the first member, and
a third external tab extends outwardly from the first member; and
a second member attached to the first member, wherein:
a second internal ridge circumferentially extends partway along the second member, the second internal ridge being circumferentially divided into at least third and fourth ridge segments that are circumferentially spaced apart, the third ridge segment having a fourth circumferential dimension that is smaller than the third circumferential dimension of the second gap, and
a fourth external tab extends outwardly from the second member;
wherein the first and second members are rotationally movable relative to each other between:
a first locked position in which:
the third and fourth external tabs are positioned relative to each other in a first relative circumferential orientation to indicate that the first and second members are in the first locked position; and
engagement between the third ridge segment of the second internal ridge of the second member and the second external ridge of the first member obstructs translational movement of the second member relative to the first member to detach the second member from the first member;
and
a first unlocked position in which:
the third and fourth external tabs are positioned relative to each other in a second relative circumferential orientation to indicate that the first and second members are in the first unlocked position, the second relative circumferential orientation being different than the first relative circumferential orientation; and
circumferential alignment of the third ridge segment of the second internal ridge of the second member with the second gap of the first member permits translational movement of the second member relative to the first member to detach the second member from the first member;
wherein the first and second members, in combination, define the second internal cavity;
wherein the container lid further comprises a plurality of protrusions extending within the second internal cavity;
wherein the first and second members are rotationally movable relative to each other to cause the plurality of protrusions to grind solid materials located in the second internal cavity;
wherein the plurality of protrusions comprises:
a first protrusion connected to the first member; and
a second protrusion connected to the second member; and
wherein the first member and the container body are rotationally movable relative to each other between:
a second locked position in which:
the first and second external tabs are positioned relative to each other in a third relative circumferential orientation to indicate that the first member and the container body are in the second locked position; and
engagement between the first ridge segment of the first internal ridge of the first member and the first external ridge of the container body obstructs translational movement of the first member relative to the container body to detach the container lid from the container body;
and
a second unlocked position in which:
the first and second external tabs are positioned relative to each other in a fourth relative circumferential orientation to indicate that the first member and the container body are in the second unlocked position, the fourth relative circumferential orientation being different than the third relative circumferential orientation; and
circumferential alignment of the first ridge segment of the first internal ridge of the first member with the first gap of the container body permits translational movement of the first member relative to the container body to detach the container lid from the container body.

2. The apparatus of claim 1, wherein:
the first external tab is circumferentially aligned with the first gap;
the second external tab is circumferentially aligned with the second gap;
the third external tab is circumferentially aligned with the first ridge segment; and
the fourth external tab is circumferentially aligned with the third ridge segment.

3. The apparatus of claim 2, wherein the second external tab is circumferentially misaligned with the first ridge segment.

4. The apparatus of claim 2, wherein the third external tab is circumferentially misaligned with the second gap.

5. An apparatus, comprising:
a container body defining a first internal cavity, wherein:
an external ridge circumferentially extends partway along the container body, the first external ridge defining circumferentially opposing first and second end portions that are spaced apart from each other by a gap having a first circumferential dimension, a first external tab extends outwardly from the container body; and a container lid attached to the container body and defining a second internal cavity, the container lid comprising:

a plurality of protrusions extending within the second internal cavity; and a barrier wall that prevents, or at least reduces, communication of solid materials located in the first internal cavity to the second internal cavity;

wherein the container lid further comprises:

a first member attached to the container body, wherein:

an internal ridge circumferentially extends partway along the first member, the internal ridge being circumferentially divided into at least first and second ridge segments that are circumferentially spaced apart, the first ridge segment having a second circumferential dimension that is smaller than the first circumferential dimension of the gap, and a second external tab extends outwardly from the first member; and a second member attached to the first member, the first and second members, in combination, defining the second internal cavity;

wherein the barrier wall is part of the first member attached to the container body;

wherein the first and second members are rotationally movable relative to each other to cause the plurality of protrusions to grind solid materials located in the second internal cavity;

wherein the plurality of protrusions comprises:

a first protrusion connected to the first member; and a second protrusion connected to the second member; and wherein the first member and the container body are rotationally movable relative to each other between:

a locked position in which:

the first and second external tabs are positioned relative to each other in a first relative circumferential orientation to indicate that the first member and the container body are in the locked position; and engagement between the first ridge segment of the internal ridge of the first member and the external ridge of the container body obstructs translational movement of the first member relative to the container body to detach the container lid from the container body; and an unlocked position in which:

the first and second external tabs are positioned relative to each other in a second relative circumferential orientation to indicate that the first member and the container body are in the unlocked position, the second relative circumferential orientation being different than the first relative circumferential orientation; and circumferential alignment of the first ridge segment of the internal ridge of the first member with the gap of the container body permits translational movement of the first member relative to the container body to detach the container lid from the container body.

6. The apparatus of claim 5, wherein the barrier wall is devoid of any through openings.

7. The apparatus of claim 5, wherein:

the first external tab is circumferentially aligned with the gap; and the second external tab is circumferentially misaligned with the first ridge segment.

8. An apparatus, comprising:

a first member, wherein:

an external ridge circumferentially extends partway along the first member, the external ridge defining circumferentially opposing first and second end portions that are spaced apart from each other by a qap having a first circumferential dimension, and a first external tab extends outwardly from the first member; and a second member attached to the first member, the first and second members, in combination, defining an internal cavity, wherein:

an internal ridge circumferentially extends partway along the second member, the internal ridge being circumferentially divided into at least first and second ridge segments that are circumferentially spaced apart, the first ridge segment having a second circumferential dimension that is smaller than the first circumferential dimension of the gap, and a second external tab extends outwardly from the second member;

wherein the first member is attachable to a container body defining another internal cavity;

wherein the first and second members are rotationally movable relative to each other between:

locked position in which:

the first and second external tabs are positioned relative to each other in a first relative circumferential orientation to indicate that the first and second members are in the locked position, and engagement between the first ridge segment of the internal ridge of the second member and the external ridge of the first member obstructs translational movement of the second member relative to the first member to detach the second member from the first member; and an unlocked position in which:

the first and second external tabs are positioned relative to each other in a second relative circumferential orientation to indicate that the first and second members are in the unlocked position, the second relative circumferential orientation being different than the first relative circumferential orientation, and circumferential alignment of the first ridge segment of the internal ridge of the second member with the gap of the first member permits translational movement of the second member relative to the first member to detach the second member from the first member;

wherein the container lid further comprises a plurality of protrusions extending within the internal cavity;

wherein the first and second members are rotationally movable relative to each other to cause the plurality of protrusions to grind solid materials located in the internal cavity; and wherein the plurality of protrusions comprises:

a first protrusion connected to the first member; and
a second protrusion connected to the second member.

9. The apparatus of claim 8, wherein:
the first external tab is circumferentially misaligned with the gap; and
the second external tab is circumferentially aligned with the first ridge segment.

* * * * *

UNITED STATES PATENT AND TRADEMARK OFFICE
CERTIFICATE OF CORRECTION

Page 1 of 1

PATENT NO. : 11,019,962 B2
APPLICATION NO. : 16/923668
DATED : June 1, 2021
INVENTOR(S) : Merrilee Kick It is certified that error appears in the above-identified patent and that said Letters Patent is hereby corrected as shown below:

In the Claims

Claim 8, Column 18, Line 13, change "each other by a qap" to -- each other by a gap --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*